United States Patent
Österberg et al.

(10) Patent No.: US 7,819,308 B2
(45) Date of Patent: Oct. 26, 2010

(54) CASH DEPOSIT APPARATUS AND METHOD

(75) Inventors: Mårten Österberg, Lund (SE); Johan Svensson, Lund (SE)

(73) Assignee: ScanCoin AB, Malmo (SE)

( * ) Notice: Subject to any disclaimer, the term of this patent is extended or adjusted under 35 U.S.C. 154(b) by 0 days.

(21) Appl. No.: 11/683,140

(22) Filed: Mar. 7, 2007

(65) Prior Publication Data

US 2007/0210149 A1    Sep. 13, 2007

Related U.S. Application Data

(60) Provisional application No. 60/780,754, filed on Mar. 9, 2006.

(30) Foreign Application Priority Data

Mar. 8, 2006    (SE)    .................................... 0600519

(51) Int. Cl.
G06Q 40/00    (2006.01)
(52) U.S. Cl. .................... 235/379; 235/380; 902/11; 705/43
(58) Field of Classification Search ................ 235/379, 235/380; 194/346; 705/43; 902/11
See application file for complete search history.

(56) References Cited

U.S. PATENT DOCUMENTS

| | | | |
|---|---|---|---|
| 2,519,357 A | 8/1950 | Daugherty | |
| 2,646,805 A | 7/1953 | Anderson | |
| 3,147,839 A | 9/1964 | White, Jr. | |
| 3,196,887 A | 7/1965 | White, Jr. | |
| 3,828,166 A | 8/1974 | Johansson et al. | |
| 4,286,703 A | 9/1981 | Schuller et al. | |
| 4,360,034 A | 11/1982 | Davila et al. | |
| 4,376,442 A | 3/1983 | Gomez et al. | |

(Continued)

FOREIGN PATENT DOCUMENTS

CA    2 320 646 A1    6/2001

(Continued)

OTHER PUBLICATIONS

International Preliminary Report on Patentability—PCT/SE2005/001120—Dated Oct. 10, 2006.

(Continued)

*Primary Examiner*—Daniel A Hess
*Assistant Examiner*—Rafferty Kelly
(74) *Attorney, Agent, or Firm*—Womble Carlyle Sandridge & Rice, PLLC

(57) ABSTRACT

A cash deposit apparatus has a first cash processing unit capable of performing a first cash deposit transaction involving receiving first cash from a user and processing the first cash so as to determine a value of the first cash, and a second cash processing unit capable of performing a second cash deposit transaction involving receiving second cash from the same user and processing the second cash so as to determine a value of the second cash. The apparatus also has a user interface unit and a controller, which is operatively coupled to the first and second cash processing units and to the user interface unit. The controller will detect a first input from the user, control the first cash processing unit, detect a second input from the user, and control the second cash processing unit.

31 Claims, 17 Drawing Sheets

U.S. PATENT DOCUMENTS

| | | | |
|---|---|---|---|
| 4,383,540 A | 5/1983 | DeMeyer et al. | |
| 4,541,057 A | 9/1985 | Hagiwara | |
| 4,558,712 A | 12/1985 | Sentoku et al. | |
| 4,595,828 A | 6/1986 | Lundblad | |
| 4,636,947 A | 1/1987 | Ward | |
| 4,733,765 A | 3/1988 | Watanabe | |
| 4,744,468 A | 5/1988 | Goi et al. | |
| 4,964,495 A | 10/1990 | Rasmussen | |
| 4,988,849 A | 1/1991 | Sasaki et al. | |
| 4,995,848 A | 2/1991 | Goh | |
| 5,027,935 A | 7/1991 | Berg et al. | |
| 5,302,811 A | 4/1994 | Fukatsu | |
| 5,340,967 A | 8/1994 | Martin et al. | |
| 5,469,951 A | 11/1995 | Takemoto et al. | |
| 5,483,047 A | 1/1996 | Ramachandran et al. | |
| 5,561,281 A | 10/1996 | Eda et al. | |
| 5,564,546 A | 10/1996 | Molbak et al. | |
| 5,620,079 A | 4/1997 | Molbak | |
| 5,662,201 A | 9/1997 | Gerlier et al. | |
| 5,799,767 A | 9/1998 | Molbak | |
| 5,883,371 A | 3/1999 | Meeker | |
| 5,902,178 A | 5/1999 | Perkitny | |
| 5,909,794 A | 6/1999 | Molbak et al. | |
| 5,982,918 A * | 11/1999 | Mennie et al. | 382/135 |
| 6,047,807 A * | 4/2000 | Molbak | 194/217 |
| 6,080,056 A | 6/2000 | Karlsson | |
| 6,086,471 A | 7/2000 | Zimmermann | |
| 6,116,402 A | 9/2000 | Beach et al. | |
| 6,128,402 A | 10/2000 | Jones et al. | |
| 6,131,809 A | 10/2000 | Drescher et al. | |
| 6,206,284 B1 | 3/2001 | Do et al. | |
| 6,318,536 B1 | 11/2001 | Korman et al. | |
| 6,318,537 B1 * | 11/2001 | Jones et al. | 194/346 |
| 6,349,972 B1 | 2/2002 | Geiger et al. | |
| 6,422,458 B1 | 7/2002 | Katou et al. | |
| 6,481,620 B1 | 11/2002 | Katou et al. | |
| 6,484,863 B1 | 11/2002 | Molbak | |
| 6,494,776 B1 | 12/2002 | Molbak | |
| 6,502,746 B1 | 1/2003 | Do et al. | |
| 6,601,045 B1 * | 7/2003 | DePietro et al. | 705/43 |
| 6,607,124 B1 | 8/2003 | Junkins et al. | |
| 6,609,604 B1 | 8/2003 | Jones et al. | |
| 6,637,576 B1 | 10/2003 | Jones et al. | |
| 6,640,156 B1 | 10/2003 | Brooks et al. | |
| 6,644,696 B2 | 11/2003 | Brown et al. | |
| 6,736,251 B2 | 5/2004 | Molbak | |
| 6,789,732 B2 | 9/2004 | Dollhopf et al. | |
| 6,854,581 B2 | 2/2005 | Molbak | |
| 6,896,118 B2 | 5/2005 | Jones et al. | |
| 6,896,177 B2 | 5/2005 | Carter | |
| 6,934,688 B2 | 8/2005 | Carter | |
| 6,968,321 B1 | 11/2005 | Yu | |
| 6,976,570 B2 | 12/2005 | Molbak | |
| 6,981,633 B2 | 1/2006 | Inoue et al. | |
| 6,983,836 B2 | 1/2006 | Adams et al. | |
| 7,028,827 B1 | 4/2006 | Molbak et al. | |
| 7,036,651 B2 | 5/2006 | Tam et al. | |
| 7,073,707 B2 | 7/2006 | Carter | |
| 7,077,312 B2 * | 7/2006 | Putman et al. | 235/379 |
| 7,131,580 B2 | 11/2006 | Molbak | |
| 7,163,454 B2 | 1/2007 | Carter | |
| 7,192,341 B2 | 3/2007 | Takamisawa et al. | |
| 7,213,697 B2 | 5/2007 | Martin et al. | |
| 7,244,175 B2 | 7/2007 | Adams et al. | |
| 7,303,119 B2 | 12/2007 | Molbak | |
| 2002/0019210 A1 | 2/2002 | Cole | |
| 2002/0151267 A1 | 10/2002 | Kuhlin et al. | |
| 2002/0156734 A1 | 10/2002 | Yamamoto | |
| 2003/0057271 A1 | 3/2003 | Andersen et al. | |
| 2003/0111395 A1 | 6/2003 | Aas et al. | |
| 2003/0150688 A1 | 8/2003 | Martin et al. | |
| 2004/0099729 A1 | 5/2004 | Utz et al. | |
| 2004/0149818 A1 | 8/2004 | Shepley et al. | |
| 2004/0181481 A1 | 9/2004 | Carter | |
| 2004/0186937 A1 | 9/2004 | Jonsson | |
| 2004/0188221 A1 | 9/2004 | Carter | |
| 2004/0200690 A1 | 10/2004 | Adams et al. | |
| 2004/0212141 A1 | 10/2004 | Graef et al. | |
| 2004/0226493 A1 | 11/2004 | Siemens et al. | |
| 2004/0231956 A1 | 11/2004 | Adams et al. | |
| 2005/0167482 A1 | 8/2005 | Ramachandran et al. | |
| 2006/0060363 A2 | 3/2006 | Carter | |
| 2006/0090909 A1 | 5/2006 | Carter | |
| 2006/0144670 A1 | 7/2006 | Gunst et al. | |
| 2007/0069007 A1 | 3/2007 | Molbak | |

FOREIGN PATENT DOCUMENTS

| | | |
|---|---|---|
| DE | 30 121 243 | 10/1980 |
| EP | 0 310 452 | 3/1988 |
| EP | 0 734 001 | 9/1996 |
| EP | 0 831 431 A2 | 3/1998 |
| EP | 0 911 769 | 4/1999 |
| EP | 1 008 965 A1 | 6/2000 |
| EP | 1 256 915 A1 | 11/2002 |
| EP | 1 304 664 | 4/2003 |
| EP | 1 308 908 | 5/2003 |
| EP | 1 376 488 A1 | 1/2004 |
| EP | 1 378 869 | 1/2004 |
| EP | 1 381 000 A1 | 1/2004 |
| EP | 1 413 993 | 4/2004 |
| EP | 1 526 483 A2 | 4/2005 |
| EP | 1 577 846 A2 | 9/2005 |
| EP | 1 635 300 A1 | 3/2006 |
| FR | 2 784 772 | 4/2000 |
| FR | 2 819 332 | 7/2002 |
| FR | 2 824 165 | 10/2002 |
| FR | 2 841 024 | 12/2003 |
| GB | 2 415 819 | 1/2006 |
| JP | 52049097 | 4/1977 |
| JP | 2005-4347 | 1/2005 |
| JP | 2005-235081 | 9/2005 |
| SE | 504 700 | 4/1997 |
| SE | 524 041 | 4/2004 |
| WO | WO 95/30215 | 11/1995 |
| WO | WO 96/36933 | 11/1996 |
| WO | WO 97/29444 | 8/1997 |
| WO | WO 97/43739 | 11/1997 |
| WO | WO 00/37317 | 6/2000 |
| WO | WO 00/65546 | 11/2000 |
| WO | WO 01/54084 | 7/2001 |
| WO | WO 2004/010367 | 1/2004 |
| WO | WO 2004/036323 | 4/2004 |
| WO | WO 2004/081885 | 9/2004 |
| WO | WO 2004/093021 | 10/2004 |
| WO | WO 2005/104046 | 11/2005 |
| WO | WO 2006/019917 | 2/2006 |
| WO | WO 2006/062834 | 6/2006 |
| WO | WO 2007/034699 | 3/2007 |
| WO | WO 2007/035420 | 3/2007 |
| WO | WO 2008/025429 | 3/2008 |

OTHER PUBLICATIONS

Scan Coin Technical Manual, Cash Deposit System Model CDS 600 & CDS 400, 1991, Table of Contents and pp. 1-3, 7-17, 43, 44 and 49-52.

Product Model No. CDS 760—Cash Deposit System—Brochure.

Product Model No. SC2200—Scan Coin Active 2200 Coin Sorter—Brochure.

* cited by examiner

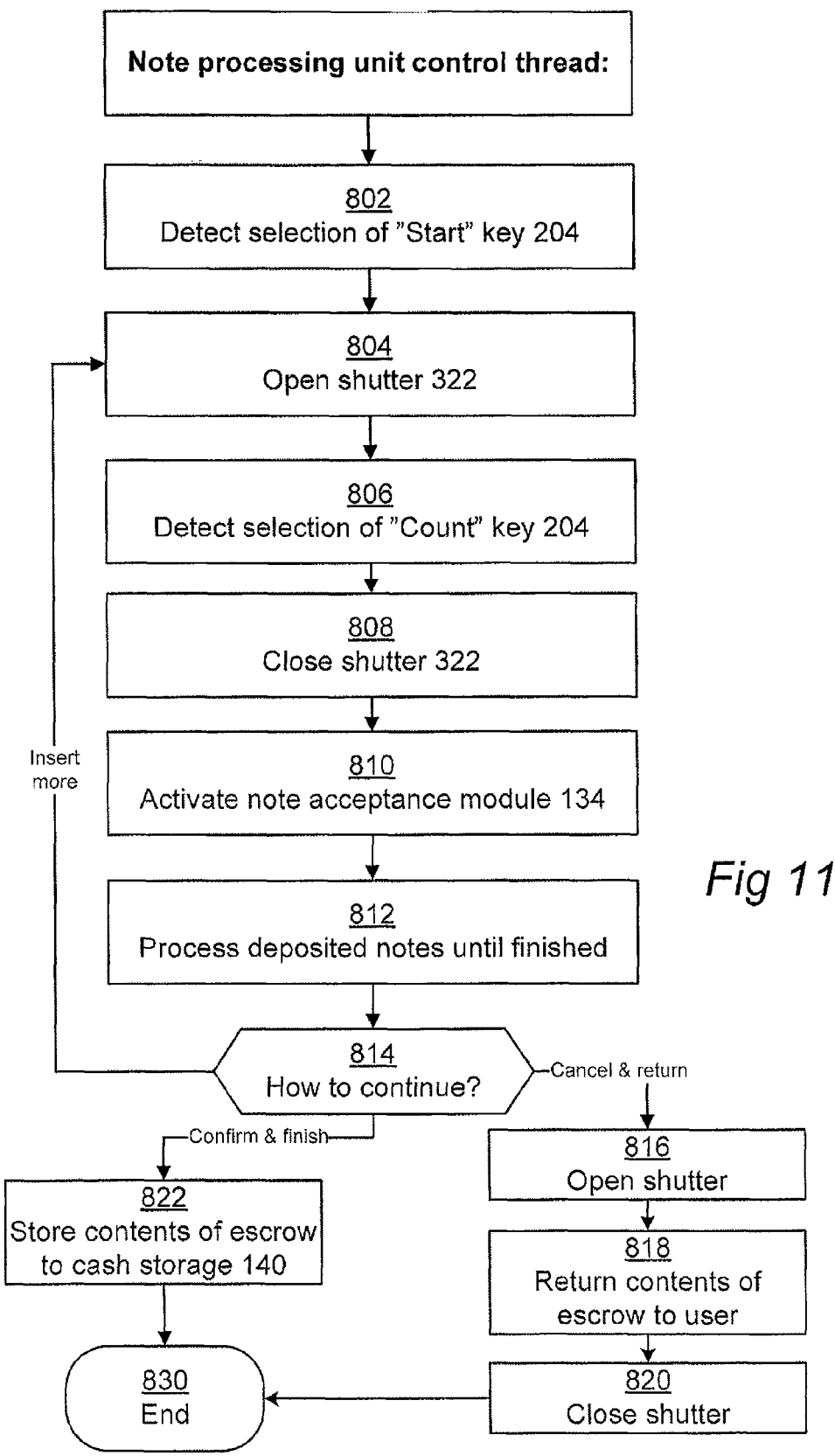

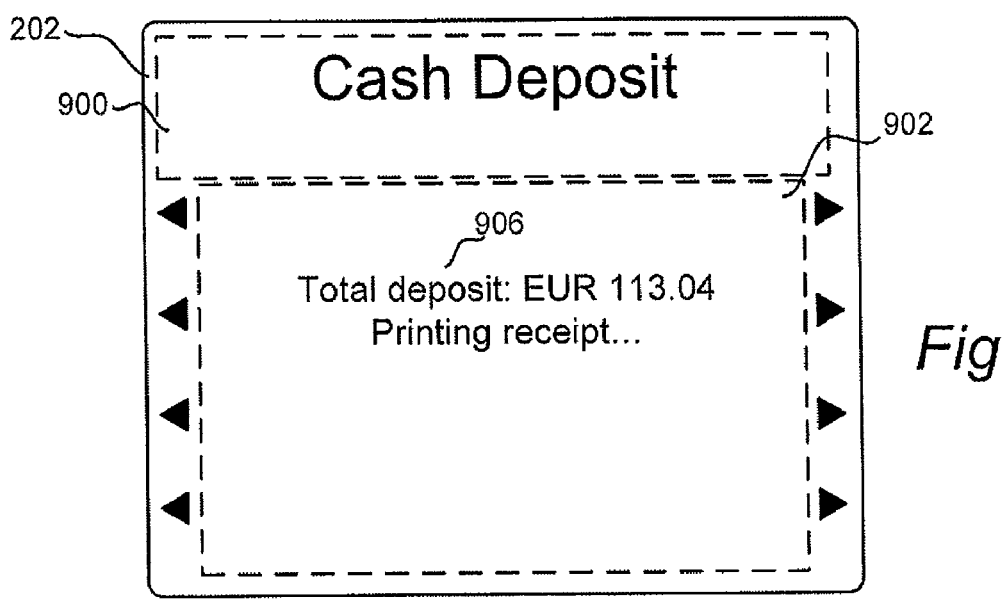

CASH DEPOSIT APPARATUS AND METHOD

CROSS-REFERENCED TO RELATED APPLICATIONS

This application claims priority to Swedish Patent Application No. 0600519-3, filed Mar. 8, 2006 and U.S. Provisional Patent Application No. 60/780,754, filed on Mar. 9, 2006.

INCORPORATION BY REFERENCE

The specification and drawings of Swedish patent application no. 0600519-3, filed Mar. 8, 2006 and the specification and drawings of U.S. provisional patent application No. 60/780,754, filed on Mar. 9, 2006, are incorporated herein in their entirety, by this reference.

FIELD OF THE INVENTION

The present invention relates to cash handling, and more particularly to a cash deposit apparatus, and to an associated method.

TECHNICAL BACKGROUND

Cash deposit apparatuses are used for depositing cash such as coins, notes (bills), cheques or coupons. A cash deposit apparatus is typically a stand-alone apparatus which is used on a self-service basis by an arbitrary, untrained user visiting a public site such as a bank office, mall, shopping area, store, etc.

When using a typical cash deposit apparatus, the user will place his cash in a cash input area, whereby the cash deposit apparatus will discriminate between acceptable cash, such as valid coins in a plurality of different denominations in one or more specified currencies, and unacceptable cash, such as fake (counterfeit) coins or coins of a foreign currency. A coin acceptance module handles the discrimination of coins and acts to count the acceptable coins, and also to sort them provided that the coin acceptance module has sorting capabilities, whereas the unacceptable cash will be rejected. A value related to the acceptable cash as counted is determined, normally either as the total value of the counted cash, or the total value minus a certain commission fee or plus a certain bonus. The determined value may be a printed on a receipt or voucher which is dispensed to the user so as to allow later redemption of the value at a checkout counter, service desk, etc, or the value may be credited to a bank account or credit card belonging to the user. The deposited cash is stored inside the cash deposit apparatus for later collection by authorized personnel such as guards or personnel from a CIT (Cash-In-Transit) company.

A cash deposit apparatus usually has a user interface which the user of the apparatus will avail himself of when using the apparatus. The user interface typically includes a display and a set of operation keys. These elements of the user interface are controlled from a controller in the apparatus, such as a personal computer (PC) or another kind of microprocessor-based control system. The controller also controls the overall operation of the internal parts of the cash deposit apparatus.

Cash deposit apparatuses have been in commercial use since the late 1980's and have grown very popular. Nevertheless, there is a general problem with long service times, i.e. the time it takes for the apparatus to serve a particular user. Shortcomings in this regard can in particular be identified for certain kinds of cash deposit apparatuses, namely the ones that are configured to handle depositions of more than one different type of cash. A common example of such a cash deposit apparatus is one that is configured both for coin depositions and for note depositions. Since coins and notes are physically very different types of cash, the cash deposit apparatus is typically equipped with separate coin processing unit and note processing unit, which may be integrated into one common apparatus housing with a common user interface unit and a central apparatus controller. Such a combined cash deposit apparatus is flexible in the sense that it can be used both by users that want to deposit coins and by users that want to deposit notes.

Some known combined cash deposit apparatuses may even allow the same individual user to deposit both coins and notes. However, the user will have to perform the different depositions sequentially, such that coins are first deposited and processed, and then notes, or vice versa. This sequential operation will cause long service times, since the total time for expediting a user will be the transaction time for the coin deposition and processing plus the transaction time for the note deposition and processing. A long service time is disadvantageous both for the currently served user and the ones that are waiting in line to use the apparatus.

SUMMARY OF THE INVENTION

A general object of the invention is to provide improvements in the above-mentioned area in the field of cash deposit apparatuses.

This object is wholly or partially achieved by a cash deposit apparatus and an associated method according to the appended independent patent claims. Preferred embodiments, and the objects, features and advantages thereof, are set forth in the dependent claims and in the following description and attached drawings.

Hence, according to one aspect of the invention, there is provided a cash deposit apparatus having a first cash processing unit capable of performing a first cash deposit transaction involving receiving first cash from a user and processing the first cash so as to determine a value of the first cash;

a second cash processing unit capable of performing a second cash deposit transaction involving receiving second cash from the same user and processing the second cash so as to determine a value of the second cash;

a user interface unit; and a controller operatively coupled to the first and second cash processing units and to the user interface unit, the controller being adapted to detect a first input from the user by the user interface unit, control the first cash processing unit to initiate and start performing the first cash deposit transaction in response to detecting the first input, during performance of the first cash deposit transaction, detect a second input from the user by the user interface unit, and during performance of the first cash deposit transaction and in response to detecting the second input, control the second cash processing unit to initiate and start performing the second cash deposit transaction.

Therefore, according to the present invention, a cash deposit apparatus is provided which allows parallel deposition and processing of cash in two different cash processing units, maneuvered by the user from a common user interface unit. As a consequence, considerably reduced service times are available compared to the prior art.

The first cash processing unit may be adapted for processing of deposited cash of a first type, such as coins, whereas the second cash processing unit may be adapted for processing of deposited cash of a second type, such as notes, the second type being different from the first type. Such different types of cash may also relate to cash of first and second currencies.

In one embodiment, the controller is further adapted to:

during performance of the first cash deposit transaction, provide, by the user interface unit, an indication to the user of a momentary aggregated value of a part of the first cash which has currently been processed by the first cash processing unit; and substantially simultaneously, during performance of the second cash deposit transaction, provide, by the user interface unit, an indication to the user of a momentary value of a part of the second cash which has currently been processed by the second cash processing unit.

In one embodiment, the user interface unit includes a display having a display area, a first part of which is allocated to the first cash deposit transaction and a second part of which is allocated to the second cash deposit transaction at least during a period of concurrent performance of both transactions.

Information related to the first cash deposit transaction may be presentable in said first part of the display area, and information related to the second cash deposit transaction may be presentable in said second part of the display area.

Aforesaid indication of a momentary aggregated value of a part of the first cash may be presentable in said first part of the display area, and said indication of a momentary aggregated value of a part of the second cash may be presentable in said second part of the display area.

The user interface unit may further include selective input devices, wherein one or more control options for said user to control said first cash deposit transaction are presentable in said first part of the display area for selection by a selective input device, and wherein one or more control options for said user to control said second cash deposit transaction are presentable in said second part of the display area for selection by said selective input device.

In one embodiment, the selective input devices comprise a number of hardware functional keys disposed outside a perimeter of the display area, and the control options are presented as explanatory text labels or symbols next to the associated hardware functional keys. In other embodiments, the display may for instance have a touch-sensitive display area, wherein the selective input devices may be realized as software buttons on the touch-sensitive display area.

According to the invention, presentation, selection and performance of control options for the first cash deposit transaction are handled by the controller independently of the second cash deposit transaction without affecting the second cash processing unit's performance thereof, and vice versa.

When one of said first and second cash deposit transactions has reached a stage where all hitherto received cash has been processed by its cash processing unit, control options may be presented for said one transaction which include a first option for depositing more cash, a second option for confirming the value determined for the received cash, and a third option for canceling the transaction.

Upon selection of said first option, the controller may be adapted to control the cash processing unit for said one transaction to receive additional cash from said user and process it so as to determine a joint value of the hitherto received cash and the additional cash.

Upon selection of said second option, the controller may be adapted to control the cash processing unit for said one transaction to move the hitherto received cash from an intermediate escrow position in the cash deposit apparatus to a cash storage end position which is inaccessible to said user.

Upon selection of said third option, the controller may be adapted to control the cash processing unit for said one transaction to move the hitherto received cash from an intermediate escrow position in the cash deposit apparatus to a cash return position which is accessible to said user.

The cash deposit apparatus may further comprise a transaction value registering device, wherein the controller may be further adapted, upon completion of said first cash deposit transaction as well as said second cash deposit transaction, to:

determine a grand total result of said first and second cash deposit transactions by aggregating the determined value of the first cash and the determined value of the second cash, and control the transaction value registering device to register the grand total result.

The transaction value registering device may for instance be selected from the group consisting of a printer of redeemable receipts or vouchers, a recorder for recording the grand total result on a data carrier (for instance a card inserted in a card reader), and a device for communicating the value to a remote server or other computer resource.

A second aspect of the invention is a method of controlling a cash deposit apparatus capable of performing a first cash deposit transaction involving receiving first cash from a user and processing the first cash so as to determine a value of the first cash, and capable of performing a second cash deposit transaction involving receiving second cash from the same user and processing the second cash so as to determine a value of the second cash, the method involving:

detecting, by a user interface unit, a first input from the user;

initiating and starting to perform the first cash deposit transaction in response to detecting the first input;

during performance of the first cash deposit transaction, detecting, by said user interface unit, a second input from the user; and during performance of the first cash deposit transaction and in response to detecting the second input, initiating and starting to perform the second cash deposit transaction.

The method of the second aspect may have the same or corresponding features as have been described above for the first aspect.

BRIEF DESCRIPTION OF THE DRAWINGS

An exemplifying but non-limiting embodiment of a cash deposit apparatus according the invention will now be disclosed with reference to the appended drawings.

FIG. 11 is a flowchart diagram which illustrates the main steps of a control thread for the note processing unit.

FIGS. 12a-g illustrate display screen snapshots.

DETAILED DESCRIPTION OF THE ILLUSTRATED EMBODIMENTS

Figure 1:
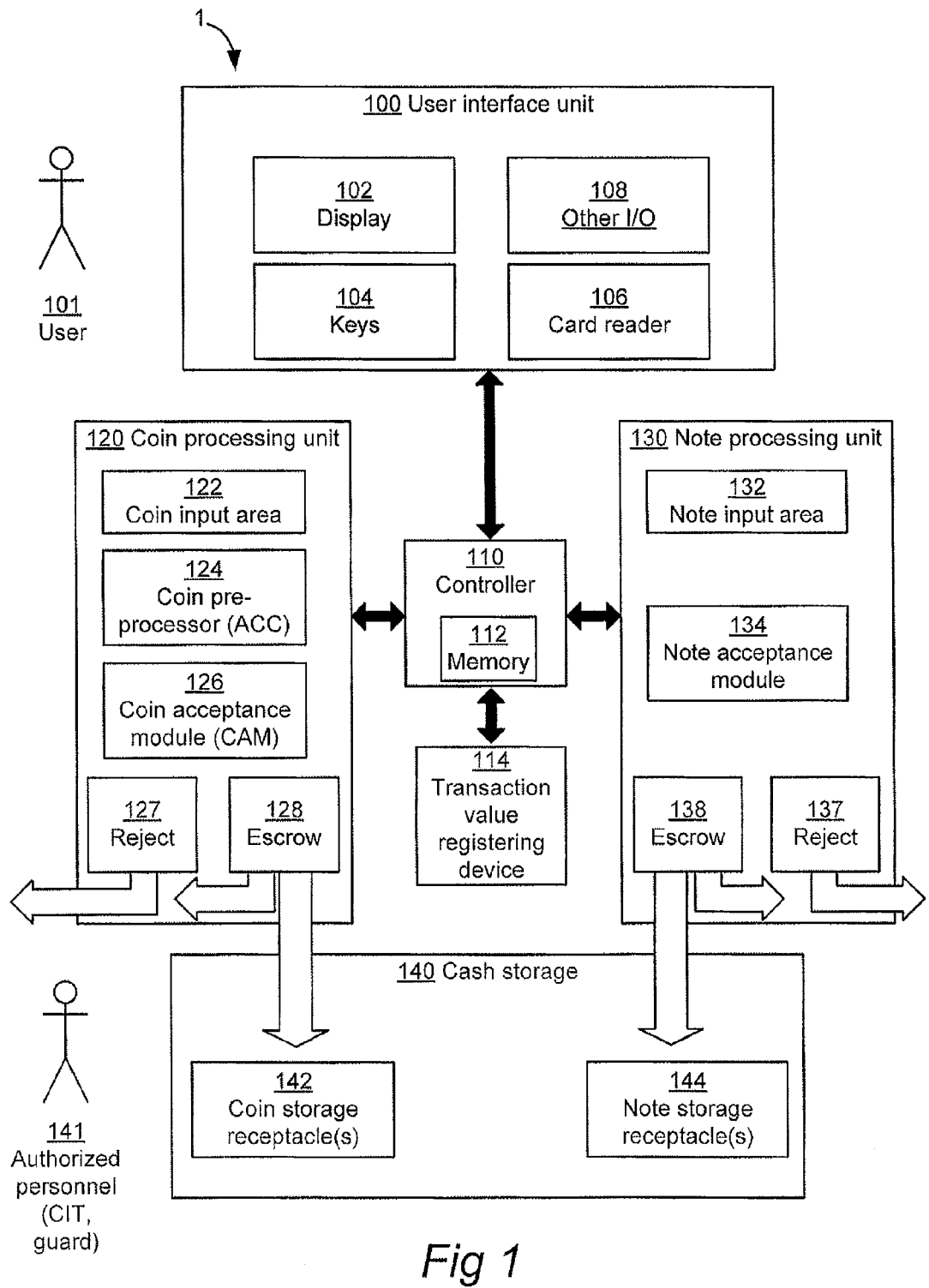
FIG. 1 is a schematic block diagram which illustrates the cash deposit apparatus on a general level, comprising as main parts a coin processing unit for coin depositions, a note processing unit for note depositions, a user interface unit and a controller.

Reference is now made to FIG. 1 which illustrates the cash deposit apparatus 1 on a general level. As seen in FIG. 1, the main parts of the cash deposit apparatus 1 are a first cash processing unit 120 (e.g., a coin processing unit for coin depositions), a second cash processing unit 130 (e.g., a note processing unit for note depositions), a user interface unit 100 and a controller 110. In addition, the cash deposit apparatus 1 has a cash storage 140 and a transaction value registering device 114.

Figure 2:
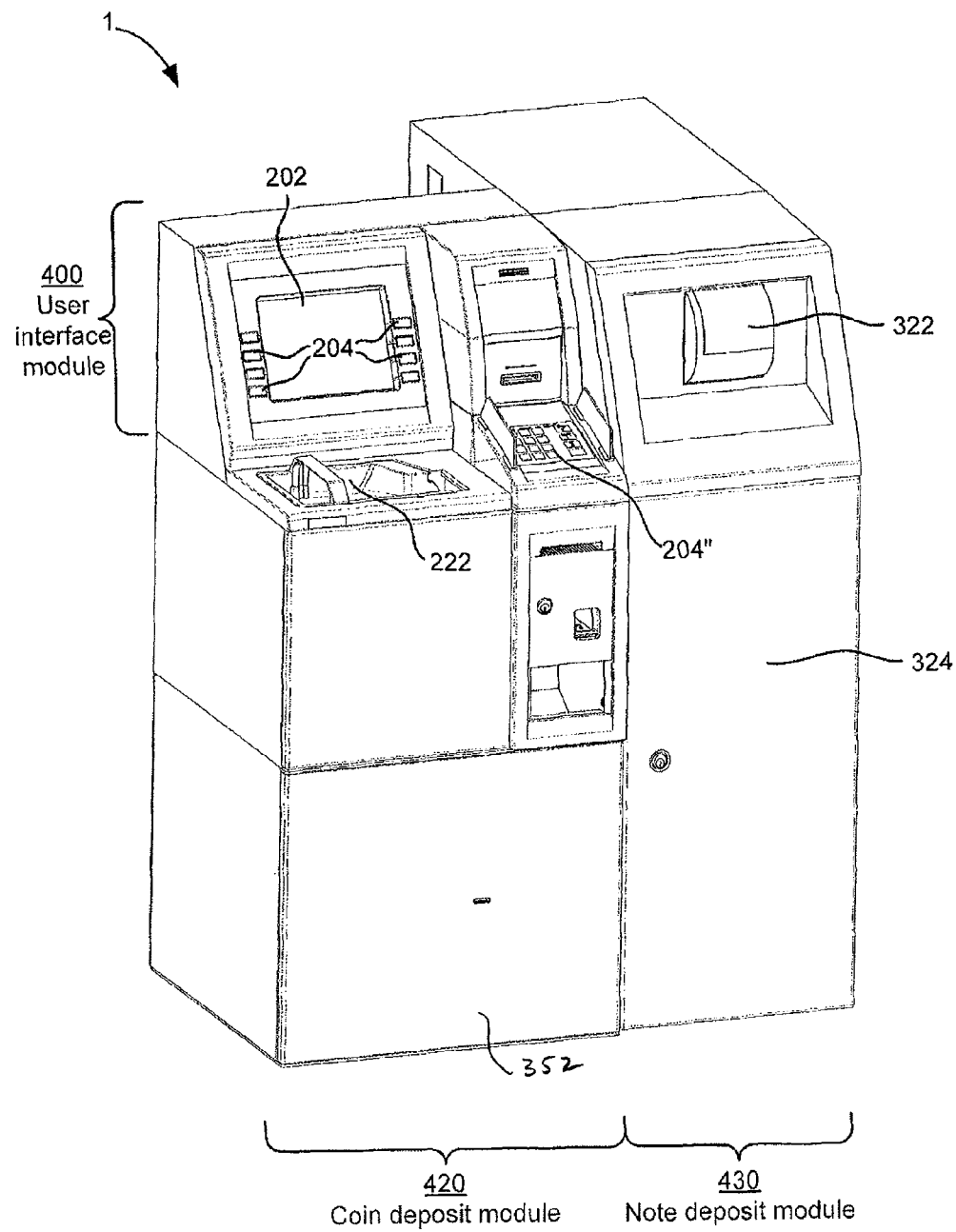
FIG. 2 is a perspective front view of the cash deposit apparatus according to the disclosed embodiment.

An embodiment of the cash deposit apparatus 1 is disclosed in FIG. 2. In FIG. 2, the coin processing unit 120 of FIG. 1 is embodied in a coin deposit module 420, the note processing unit 130 of FIG. 1 is embodied in a note deposit module 430, and the user interface unit 100 is embodied in a user interface module 400.

The embodiment of FIG. 2 is disclosed in further detail in FIGS. 3, 3A-6. However, in order not to obscure the disclosure, the note deposit module 430 has been omitted from FIGS. 3, 3A-6.

The user interface unit 100 has a display 102 and operation keys 104 (broadly "input devices"), which together form a user interface to a user 101 when using the cash deposit apparatus 1 for a cash deposit transaction. The display 102 will present information, such as help messages, error messages and transaction results, that assists the user 101 throughout the cash deposit transaction. The operation keys 104 will allow the user to provide controlling input to the cash deposit apparatus 1, for instance commands for starting, confirming or aborting a cash deposit transaction, or commands for selecting among different available options at various stages of the transaction, as will be further explained later with reference to the remaining figures.

Figure 3:
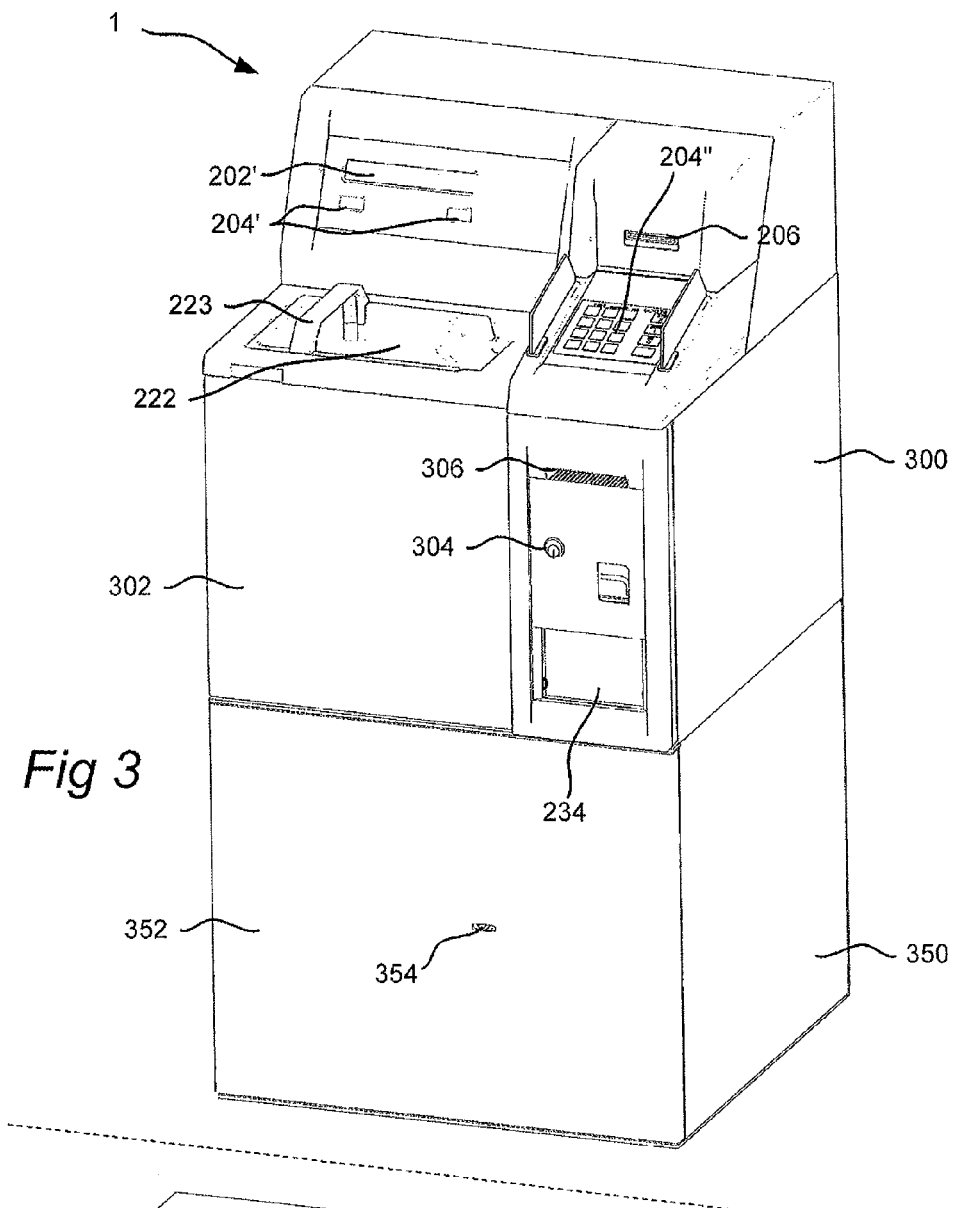
FIGS. 3, 3A, 4-6 are perspective front views of the coin processing unit and user interface unit, illustrating also some main components thereof.
Figure 3A:
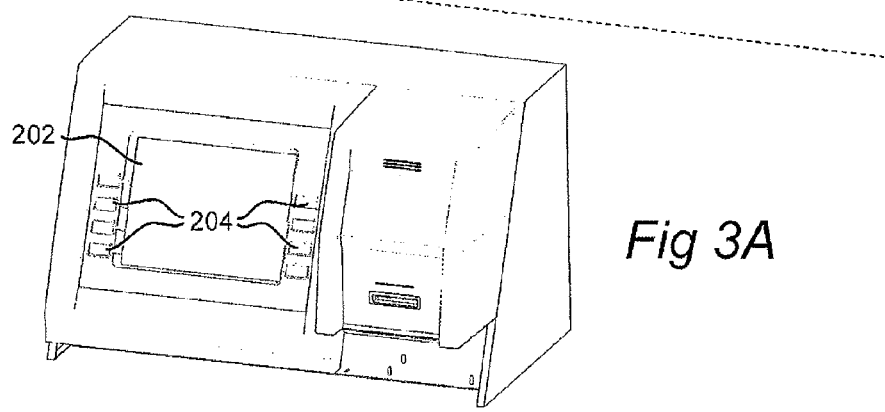
Figure 4:
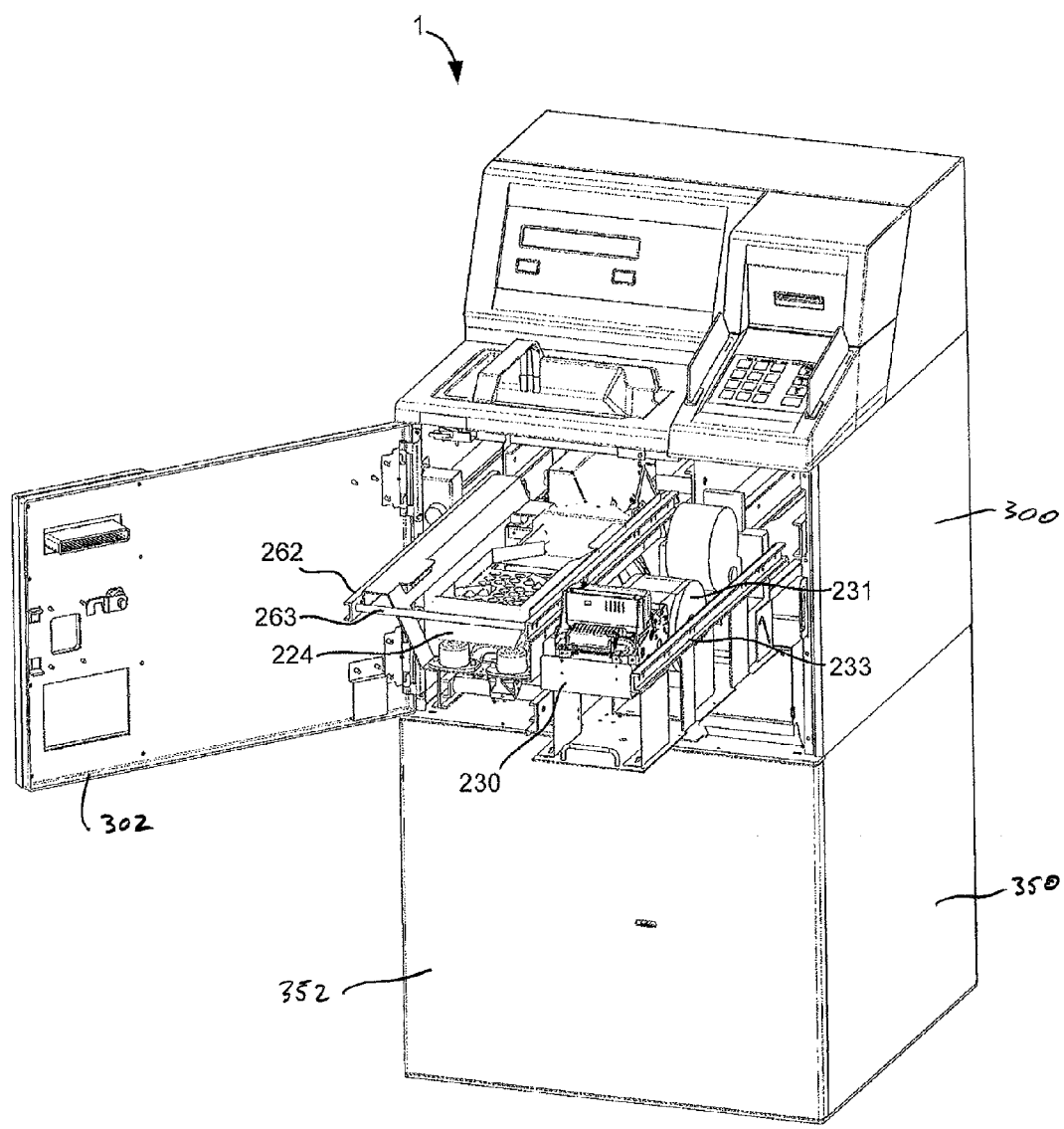
Figure 5:
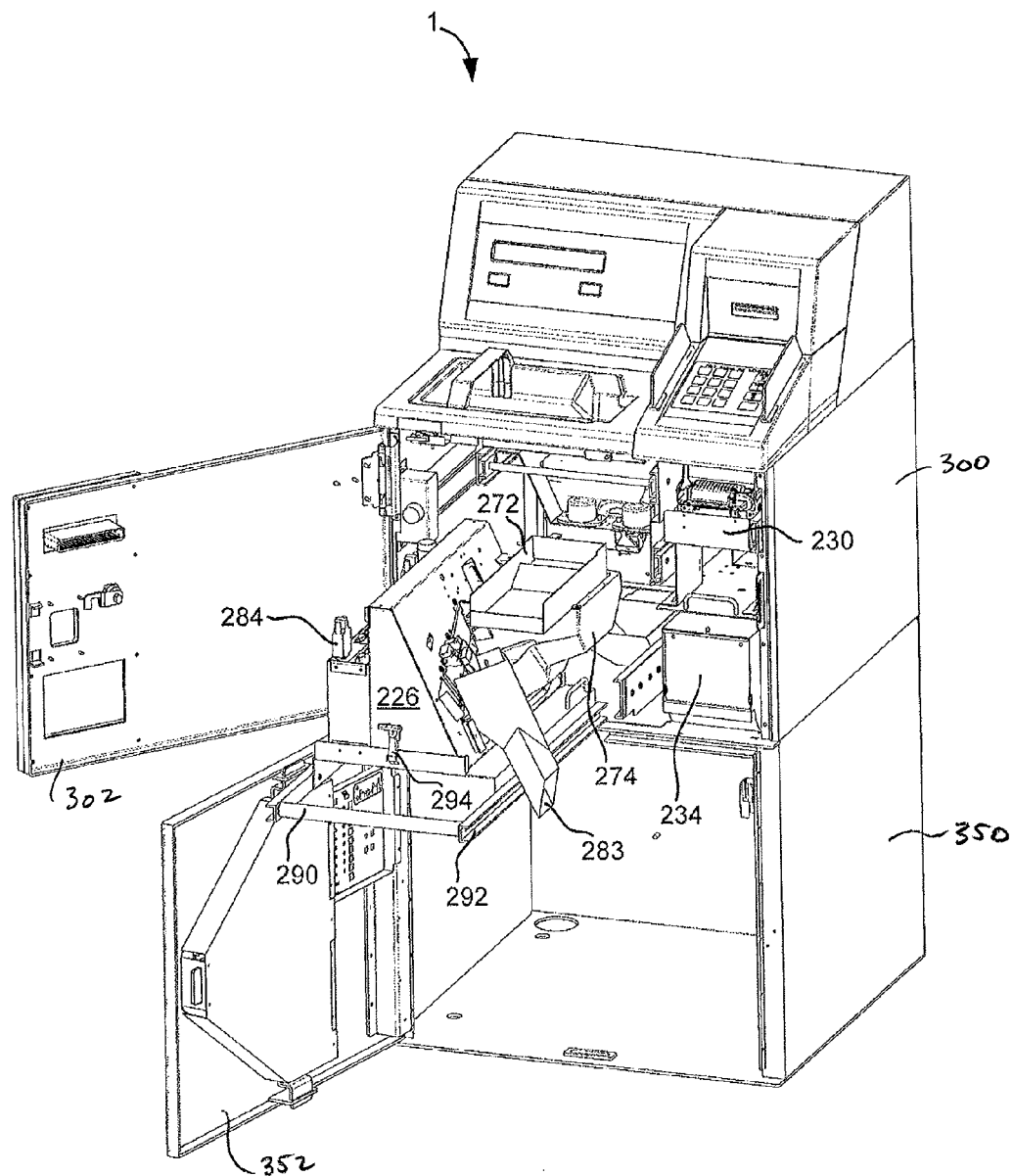

As seen in FIGS. 2 and 3A, the display 102 may be realized as a graphical color LCD display 202, and the operation keys 104 may include two rows 204 of hardware functional keys disposed at either sides of the display 202 (the functional keys also being shown as 204$_1$-204$_8$ in FIG. 7a), as well as a numerical PIN-type keypad 204". Alternatively, as seen in FIG. 3, the display 102 may be a two-row matrix (character-based) monochrome display 202', and the operation keys 104 may include START/STOP and PRINT buttons 204' as well as the numerical PIN-type keypad 204". As yet an alternative, the display 102 may be a touch-sensitive graphical color display, thereby making it possible to also implement the operation keys 104, or at least some of them, as virtual keys (software buttons) on the touch-sensitive display screen. Of course, various other design options for realizing the display 102 and operation keys 104 are available, as is readily understood by a skilled person.

The user interface unit 100 also has a card reader 106 capable of reading and/or writing digital data on a data carrier inserted in a card reader slot (only the slot 206 is seen in FIG. 3). The data carrier may for instance be an electrically, magnetically or optically readable card, such as a smart card, adapted to contain for instance information related to an identity of the user 101, or related to an asset belonging to the user such as a bank account. Alternatively, the data carrier may be adapted to receive and store information on a value resulting from a completed transaction and related to the acceptable deposited cash once processed by the cash deposit apparatus 1.

Other I/O devices such as a speaker and a microphone may be included in the user interface unit 100, as is generally represented by 108 in FIG. 1.

The note processing unit 130 has a note input area 132 for receiving a number of notes as deposited by the user 101. In the disclosed embodiment, the note input area 132 includes a shutter 322 which is controllable into an open state, where notes to be deposited can be inserted by the user, and a closed state for use during idle mode or ongoing note processing. Having a processor (CPU) or similar controller circuitry which is controllable from the controller 110, a note acceptance module 134 of the note processing unit 130 is operable to process the deposited notes and determine whether each note is acceptable (valid) and, if so, its denomination. Acceptable notes are then temporarily kept in an intermediate escrow position 138, whereas non-acceptable (reject) notes 137 are rejected upon termination of the note deposit transaction to the user 101 in the shutter 322.

The user 101 has the possibility to cancel the note transaction and have his deposited notes returned from the escrow position 138 to the shutter 322. If, upon completion of the note processing, the user 101 instead confirms the transaction, the deposited notes will be moved from the escrow position 138 to final storage in one or more note storage receptacles 144 in the cash storage 140.

The coin processing unit 120 has elements that handle the flow of coins all the way from input (deposit) by the user 101 through discrimination, counting/sorting to output into the cash storage 140. In more detail, a coin input area 122 is adapted to receive coins as deposited by the user 101. In the disclosed embodiment, the coin input area 122 includes a coin input tray 222 having a handle 223. In this embodiment, the user 101 will put into the coin input tray 222 an unsorted mass of coins, of an unknown composition that typically consists of a plurality of valid coins of mixed denominations, plus potentially some invalid coins and/or foreign matter such as dirt, dust or solid non-coin objects like screws, nuts, hair pins, studs, etc. When the mass of coins has been put into the tray 222, the user 101 may tilt the tray by lifting the handle 223. This will cause the mass of coins to slide down the bottom surface of the tray 222 and enter the interior of the coin processing unit 120.

The next stage in the coin processing unit 120 is a coin pre-processor 124 which acts to perform a conditioning or cleaning operation on the cash received through the coin input area 122. In the disclosed embodiment, the cash pre-processor 124 is an automatic coin conditioning (ACC) unit 224 that involves a vibratory arrangement of perforated plates which will separate foreign matter from the received mass of coins. As is seen particularly in FIG. 4, the ACC unit 224 is suspended by a pair of rails 262 which can be slidably withdrawn from the interior of the coin processing unit 120 by e.g. a service person pulling a horizontal front bar 263. In this way, the ACC unit 224 can be conveniently accessed for maintenance, replacement, repair or fault relief (e.g. when a coin or foreign object has gotten stuck). Any typical ACC unit known from the prior art can be used in the cash deposit apparatus 1 for separating foreign matter from coins.

As coins have been conditioned, they are forwarded to a coin acceptance module 126. In the disclosed embodiment, the coin acceptance module 126 is a coin-counting cash acceptance module (CAM) 226 which is shown in more detail in some of the drawings. The CAM 226 has a processor (CPU) or similar controller circuitry which is controllable from the controller 110. As is well known per se in the technical field, the purpose of the coin-counting CAM 226 is to discriminate each individual coin in the mass of coins received from the coin input tray through the ACC 224 and determine its type (i.e., whether the coin is invalid or valid, and, if valid, its denomination).

Figure 6:
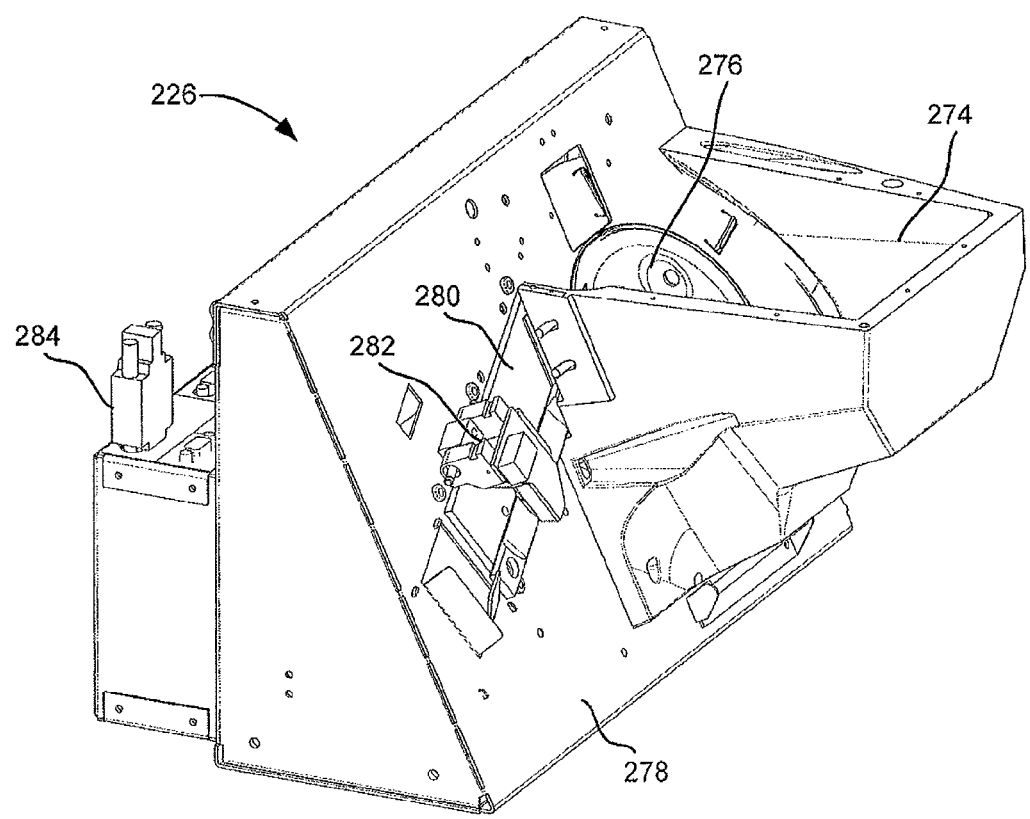

To this end, the CAM 226 will receive the coins from the output of the ACC 224 via a receiving tray 272 into a hopper bowl 274. As shown in FIG. 6, a rotary flexible disc 276 is provided in the hopper bowl 274 and acts to pick up individual coins from the bottom of the bowl and bring them, coin by coin, up to the beginning of a downwardly sloping coin rail 280 which is mounted to a backwardly inclined front plate 278 of the CAM 226. By gravity, and since the coin rail 280 is backwardly inclined, each coin will safely roll down the coin rail 280 and past a coin sensor unit 282.

The coin sensor unit 282 will detect certain physical properties of the passing coin, such as conductivity, permeability, diameter and thickness, and compare these to prestored coin reference data in a memory by way of the processor of the CAM 226. If the comparison fails to identify the coin as a coin of a valid denomination, it will be regarded as invalid and be deflected through a reject channel 283 (FIG. 5) to a coin reject position 127/234.

If on the other hand a valid denomination has been established for the coin, its denomination or associated value will be recorded for later use when calculating a total value for all valid coins processed during the coin deposit transaction upon its completion. The valid coin continues down the coin rail 280 towards its lower end, and then falls down into an intermediate escrow position 128. Much like the note processing unit 130, the user 101 has the possibility to cancel the coin transaction in the coin processing unit 120 and have the deposited coins returned from the escrow position 128 at 234. If, upon completion of the coin processing, the user 101 instead confirms the transaction, the deposited coins will be moved from the escrow position 128 to final storage in one or more coin storage receptacles 142 in the cash storage 140.

In other embodiments, the coin acceptance module 126 may be a sorting CAM which is configured after successful identification to separate the coins in different denominations and, ultimately, into different coin storage receptacles in the cash storage 140.

A transaction value registering device 114 will, upon completed cash deposit transaction, act to register an end result value of the transaction in a manner such that it can be redeemed by the user 101 as full or partial compensation for the value represented by the deposited cash. In this regard, the "transaction" may be pertain to a coin deposit transaction only (in case the user 101 desires to deposit only coins), a note deposit transaction only (in case the user 101 desires to deposit only notes), or the combination of a coin deposit transaction and a note deposit transaction (in case the user 101 desires to deposit both coins and notes). The end result value of the transaction may be equal to the accumulated nominal value of all valid cash processed during the transaction (e.g. the sum of the respective denominations of each valid coin and/or note), or related to such accumulated value by way of a currency conversion, deduction of a commission fee, or addition of a bonus award, or any combination of these.

In the disclosed embodiment, the transaction value registering device 114 involves a printer 230 which provides a printed redeemable receipt or voucher, delivered through an opening 306, in the amount indicated by the end result value of the transaction. Alternatively or additionally, the transaction value registering device 114 may involve other devices or apparatus (e.g., a recorder) for loading the end result value, or a representation thereof, onto a local data carrier, for instance a card inserted in the card reader, or a device for communicating the value to a remote server or other computer resource, linked to a bank account or other account which is accessed via remote communication means.

As already mentioned, the cash deposit apparatus 100 has a controller 110 that controls the coin processing unit 120, note processing unit 130 and user interface unit 100. The controller 110 has associated memory 112 for storing operational data, reference data and program code for various software-based functionality provided by the cash deposit apparatus 1. The controller 110 also has a number of I/O ports (one being seen at 284 in FIGS. 5 and 6), by which the various other elements of the cash deposit apparatus 1 can be operatively coupled to the controller 110. Thus, the I/O ports may for instance include one or more RS232 serial interface, Centronics parallel interface, universal serial bus interface, FireWire interface, wireless universal serial bus interface, or Bluetooth interface. Moreover, the I/O ports may include remote communication means.

In some embodiments the controller 110 may be implemented by a separate controller, such as a PC-based or ASIC-based implementation, which controls and cooperates with the processors of the coin acceptance module 126/226 and note acceptance module 134 as necessary. In other embodiments, two or all three of the controller 110 and said processors may be jointly implemented by a common device. Thus, the controller 110 and said processors shall be regarded as functional elements rather than physically separate ones.

From time to time, as service needs arise, access to the interior elements of the coin deposit module 420 or note deposit module 430 is required for a service person 121. Such service needs may include maintenance, repair, replacement or upgrade of elements such as the ACC 224, CAM 226, processor, controller 110, or printer 230. For instance, the printer 230 may have run out of paper, or it is time for scheduled maintenance of the CAM 226.

To this end, a cabinet door 302 is hinged onto the coin deposit module's cabinet (apparatus housing) 300 so as to form a part thereof. A key lock 304 keeps the cabinet door 302 closed and locked during normal operation but can be opened by the service person 121 using the correct key. Correspondingly, the note deposit module 430 has a lockable cabinet door 324 (FIG. 2).

The cash storage 140 with its storage receptacles 142, 144 serves to safely store the deposited cash. Of course, the deposited and stored cash must be collected at some time. Therefore, the cash storage 140 is accessible for an authorized person 141 so as to collect the stored cash. The authorized person may for instance be a guard of personnel from a CIT company.

To this end, a lockable cabinet door 352 is hinged to the cabinet or apparatus housing 350 of the lower part of the coin deposit module 420, housing the cash storage 140. The cabinet door 352 has a safety lock 354 which securely keeps the door closed and locked onto the cabinet by way of latches which engage with corresponding recesses. In some embodiments, notes from the note deposit module 430 are also stored in the lower part of the coin deposit module 420. In other embodiments, the notes are stored separately inside the note deposit module 430 and may in this case be collected by the authorized person 141 by unlocking the door 324.

Figure 8:
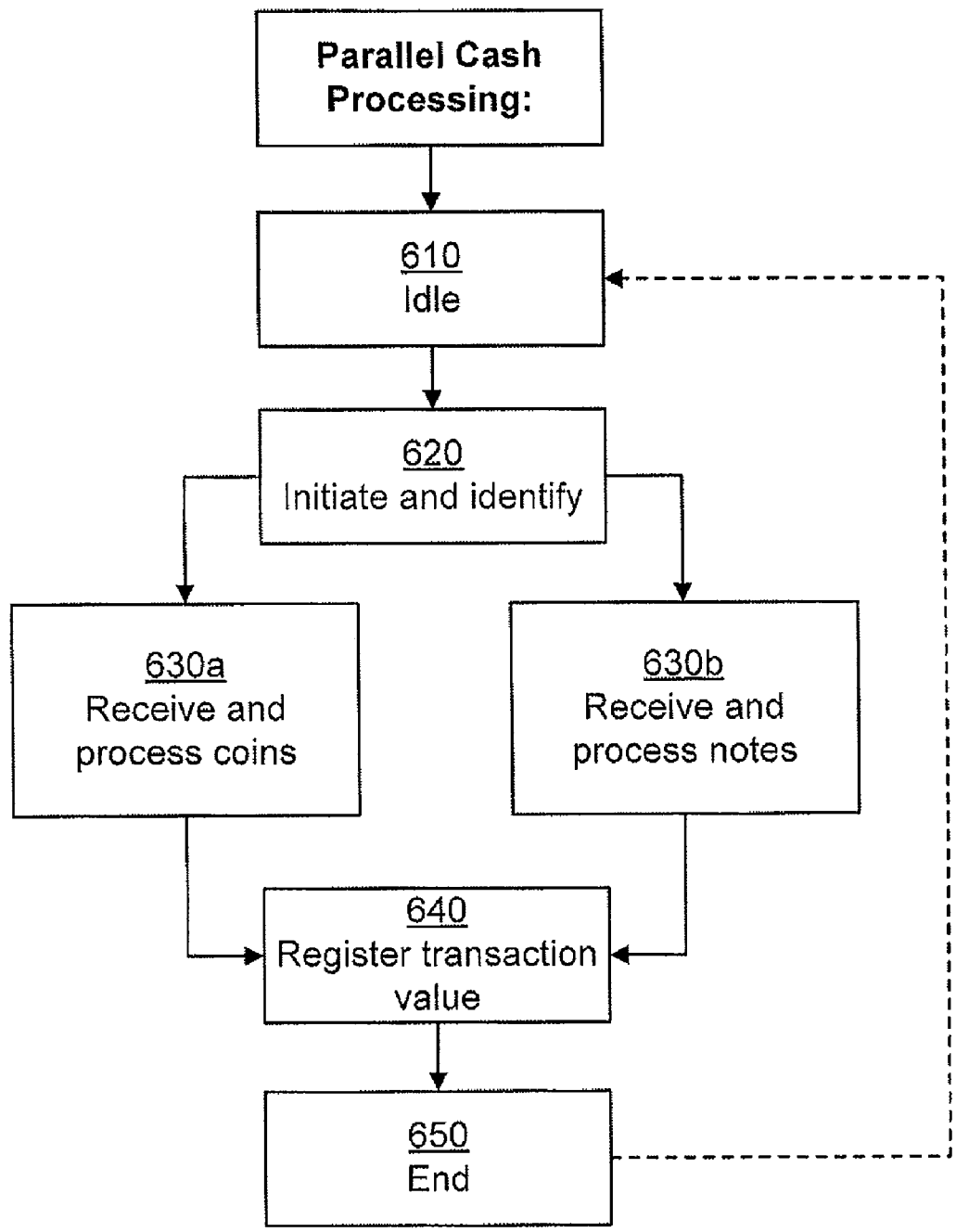
FIG. 8 is a flowchart diagram which illustrates the main steps of a method according to the disclosed embodiment.

FIG. 8 illustrates a general method for parallel cash processing with the cash deposit apparatus 1, allowing parallel deposition and processing of cash in the two different cash processing units 120 and 130, under control and supervision by the user 101 from the common user interface unit 100.

Figure 9:
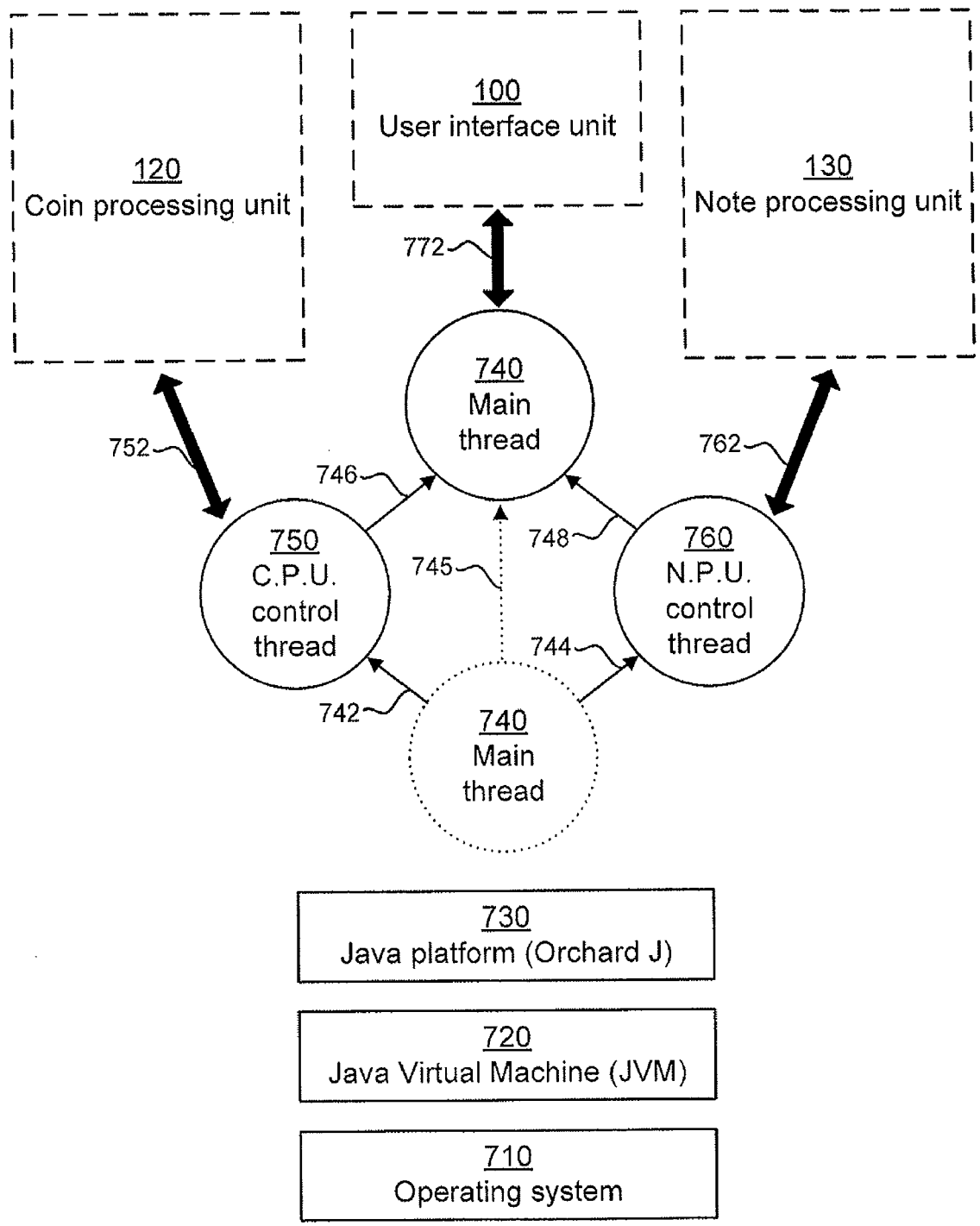
FIG. 9 is a diagram which illustrates a software architecture of the disclosed embodiment.
Figure 10:
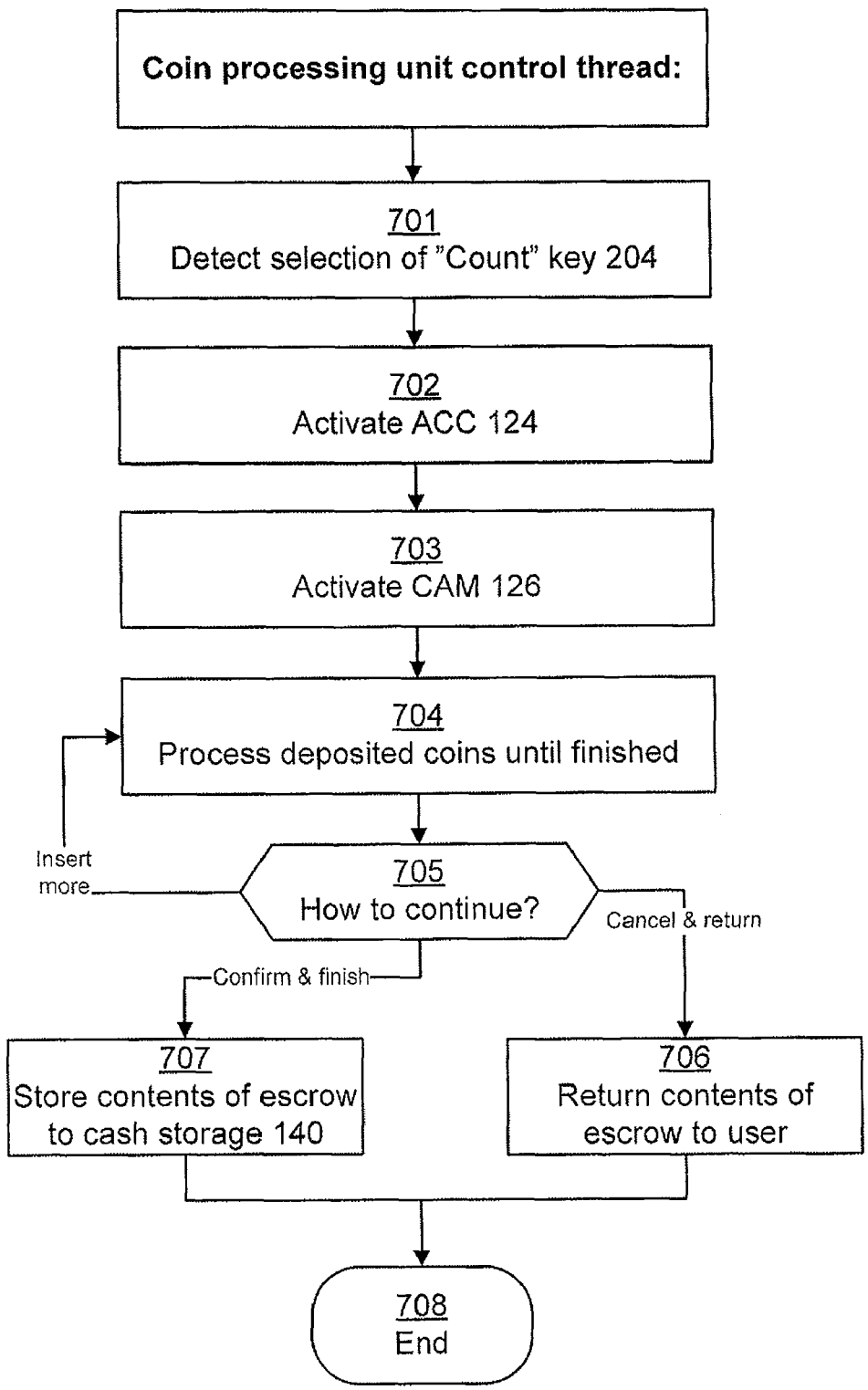
FIG. 10 is a flowchart diagram which illustrates the main steps of a control thread for the coin processing unit.

FIG. 9 illustrates a software architecture for the controller 100 which supports the parallel cash processing. Details thereof are illustrated in FIGS. 10 and 11, whereas FIGS. 7a-7k show typical display screen layouts at different stages of the processing.

Starting with FIG. 9, the software architecture of the disclosed embodiment is based on a multi-tasking operating system 710 such as Win32 (e.g. Windows XP) or Unix (e.g. Linux, Solaris). A Java Virtual Machine (JVM) 720 runs in the operating system 710, and a Java platform 730 (based e.g. on Orchard J) is handled by the JVM 720.

A main thread 740 is the overall responsible for the control of the cash deposit apparatus 1, including the coin and note processing units 120, 130. In more detail, a dedicated control thread 750 for the coin processing unit 120 is created by the main thread 740 at 742 whenever a new coin deposit transaction is to be started, as ultimately initiated by the user 101, e.g. by pressing, a function key or by initiating coin deposit. The control thread 750 will control the elements of the coin processing unit 120, as indicated by 752, in the manner illustrated further in FIG. 10.

Correspondingly, a dedicated control thread 760 for the note processing unit 130 is created by the main thread 740 at 744 whenever a new note deposit transaction is to be started, e.g. indicated by the user pressing a function key or by initiating note deposit. The control thread 760 will control the elements of the note processing unit 130, as indicated by 762, in the manner illustrated further in FIG. 11.

In parallel with any such control thread(s), the main thread 740 keeps on running, as shown at 745, and is in control of the user interface unit 100 at all times, as in shown at 772. Therefore, whenever either of the control threads 750, 760 needs to access the user interface unit 100, it will make a request at the main thread 740, which will control the user interface unit 100 to perform the needed action. A bottleneck problem with the user interface as a limited resource is avoided thanks to this parallel and independent way of operation.

Referring back to the overall flowchart of FIG. 8, during periods of inactivity, the apparatus 1 is in an idle stage 610, waiting for the user 101 to initiate a deposit transaction. In the disclosed embodiment, the display 202 shows an idle display screen like the one illustrated in FIG. 7a.

As seen in FIGS. 7a-7k, the display screen has a header area 500 and an application area 502, the latter serving to display text labels 504 next to the respective associated functional keys $204_1$-$204_8$ (broadly "input devices"). As is well known in the field, a functional key is a key that is dynamically assigned a context-dependent meaning or function in different states of an application that uses a user interface. Thus, each text label 504 represents a control option that is available at the current time and serves to explain the meaning of the control option to the user, i.e. what the resulting action will be if the associated functional key is depressed. In the idle stage of FIG. 7a, only one control option is available for selection by functional key $204_2$, namely "Start", as is indicated by text label 504.

Upon selection of "Start", the execution proceeds to an initiation/identification stage 620. Depending on an actual application, the user 101 may be prompted to insert a data carrier (FIG. 7b, using e.g. card reader 106) and/or to enter an identification code (FIG. 7c, using e.g. the PIN-type keypad 204").

Figure 7A:
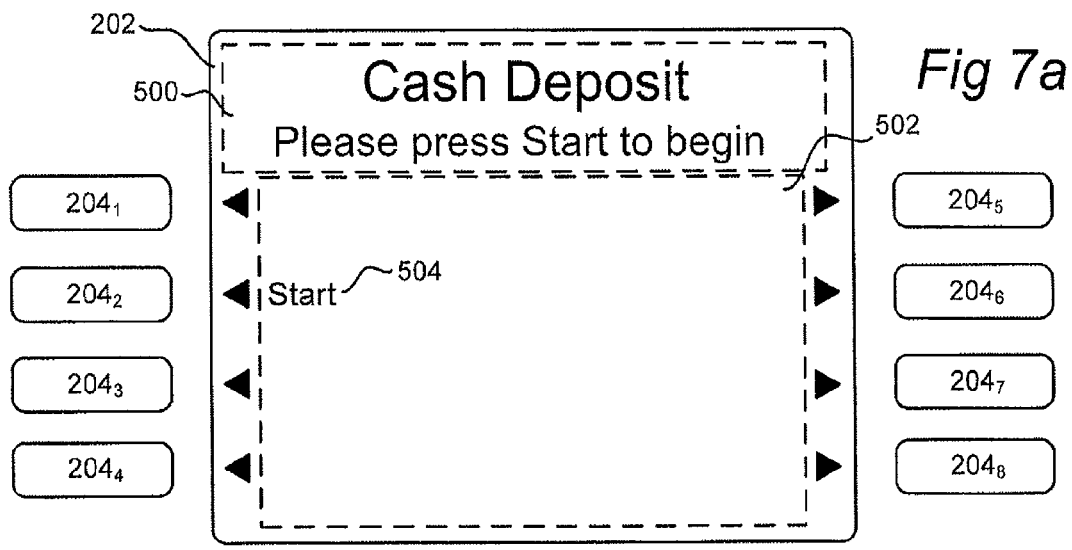
FIGS. 7*a*-7*k* illustrate display screen snapshots of the user interface unit during different stages of a typical use scenario of the cash deposit apparatus according to the disclosed embodiment.
Figure 7B:
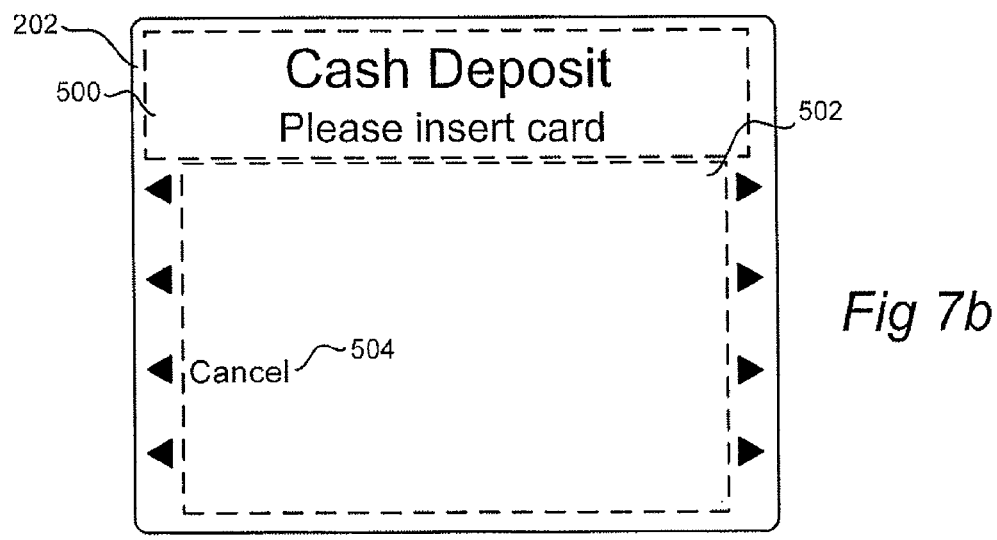
Figure 7C:
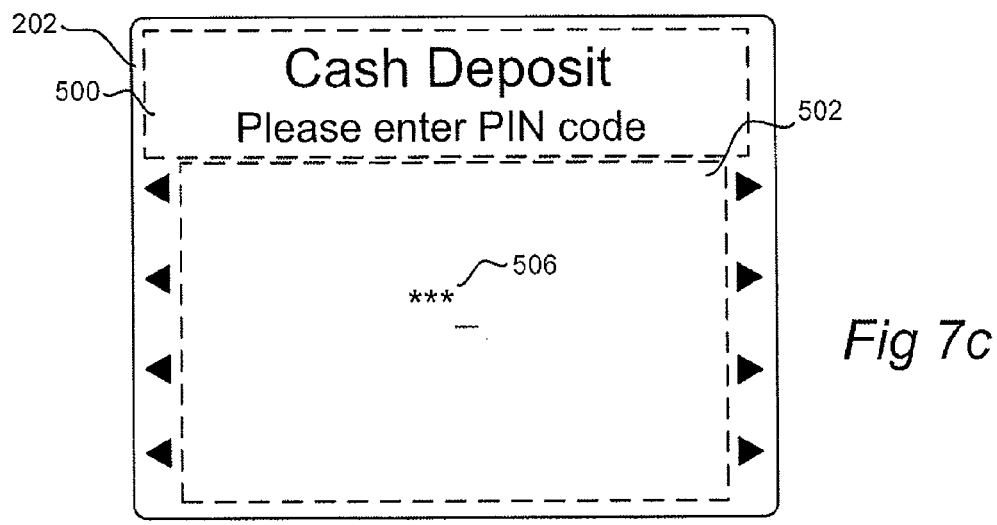
Figure 7D:
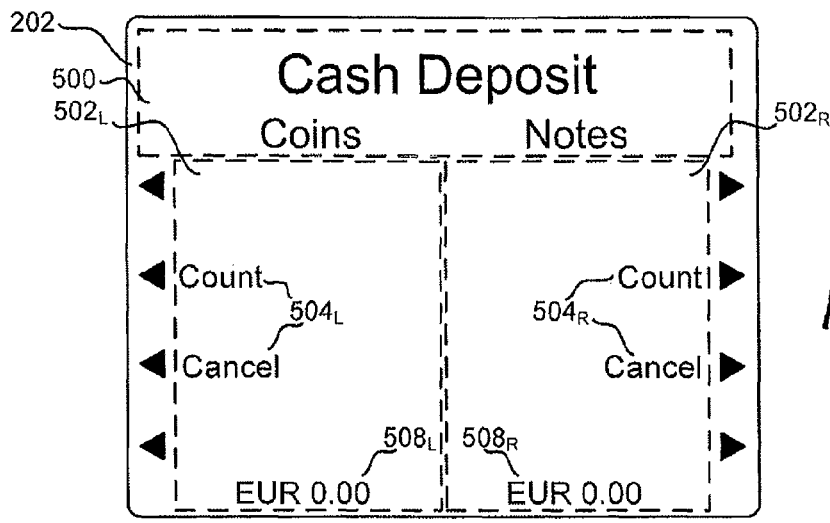

Stages 610 and 620 are handled by the main thread 740, which will continue by displaying a display screen e.g. like the one in FIG. 7d. Here, the application area is divided into a first part $502_L$, allocated for coin deposition, and a second part $502_R$, independently allocated for note deposition. Thus, in each of the first and second parts $502_L$, $502_R$, control options "Count" and "Cancel" are provided, as seen at $504_L$ and $504_R$. Moreover, a momentary value $508_L$, $508_R$ of coins and notes, respectively, that have hitherto been processed during a current transaction is shown at the bottom of each part $502_L$, $502_R$ of the application area. In the situation of FIG. 7d, no transaction has yet been initiated, and therefore the displayed momentary values are 0.00.

Figure 7E:
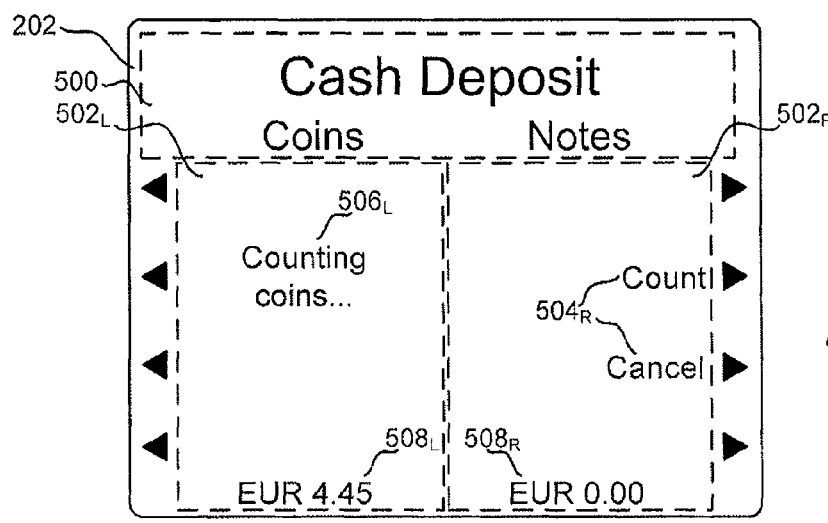

The user 101 may now, at his will, initiate a coin deposit transaction or a note deposit transaction by depressing the appropriate functional key $204_2$ or $204_6$. Assuming that a coin deposit transaction is initiated, the flowchart in FIG. 8 will enter the stage 630a, and the main thread 740 will create the control thread 750 for controlling the coin processing unit 120. As shown in FIG. 10, steps 701 through 703 of the control thread 750 will be performed, and the deposited coins received from the user in the coin input tray 222 will begin processing in step 704 in the coin processing unit 120. The display screen will look like in FIG. 7e, showing an informative text $506_L$ and a momentary processed value $508_L$ for the ongoing coin deposit transaction to the user 101 in the first part $502_L$ of the application area. The second part $502_R$ of the application area is left unchanged compared to FIG. 7d, since no note deposit transaction has yet been initiated.

The user 101 may very well stick to performing only a coin deposit transaction and just await its completion. However, thanks to the present invention, the user 101 may alternatively use this waiting time to initiate a note deposit transaction by selecting "Count" $504_R$ in FIG. 7e while the coin deposit transaction is still performing. In response, stage 630b of FIG. 8 will be entered, in parallel with the ongoing stage 630a. The main thread 740 will create the control thread 760 for controlling the note processing unit 130. As shown in FIG. 11, steps 802 through 810 of the control thread 760 will be performed, and the deposited notes received from the user in the shutter 322 will begin processing in step 812 in the note processing unit 130.

Figure 7F:
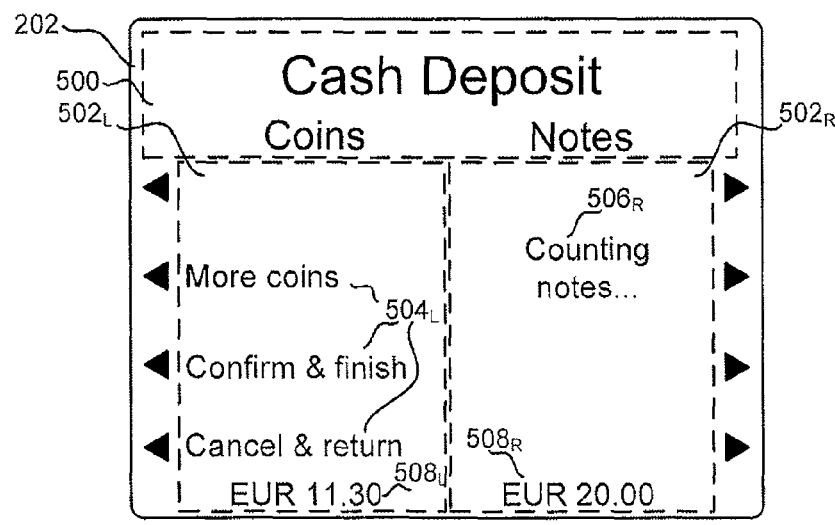

Assuming then that the coin deposit transaction reaches a stage where all received coins have been processed by the coin processing unit 120, step 705 of the control thread 750 will be reached, and the situation will be like in FIG. 7f. Here, the second part $502_R$ of the application area will show an informative text $506_R$ and a momentary processed value $508_R$ for the ongoing note deposit transaction to the user 101. The first part $502_L$ of the application area will however show three control options $504_L$.

If the user 101 has more coins that he wants to include in the coin deposit transaction, he may select the "More coins" option, wherein the execution will return to step 704 so as to receive an additional mass of coins from the user in the coin input tray 222.

If the user 101 changes his mind about the coin deposit or has reasons to believe that the total value shown at $508_L$ is not correct, he may choose "Cancel & return" to exit the transaction and have the processed coins returned at 234 from the coin escrow 128 in step 706.

If the user 101 chooses "Confirm & finish", the processed coins will be moved from the coin escrow 128 into the cash storage 140 in step 707. Execution of the control thread 750 thus ends in step 708, and it expires as seen at 746 in FIG. 9.

Figure 7G:
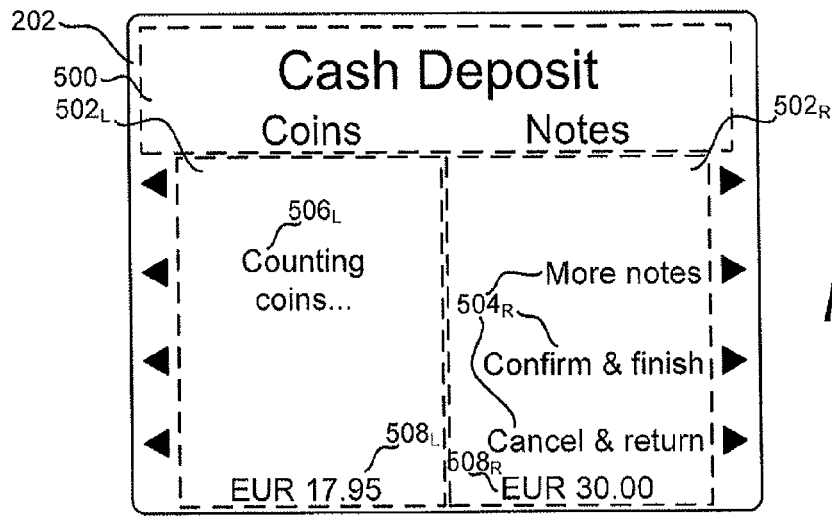

Continuing with the example, it is assumed that the user indeed chooses the "More coins" option in FIG. 7f and deposits an additional mass of coins into the apparatus 1. Next, as seen in FIG. 7g, the concurrent note processing transaction has reached a stage where all received notes have been processed by the note processing unit 130. Consequently, step 814 of its control thread 760 is entered, and three control options $504_R$ are shown in the second part $502_R$ of the application area, very much like the situation in FIG. 7f for the coins.

Figure 7H:
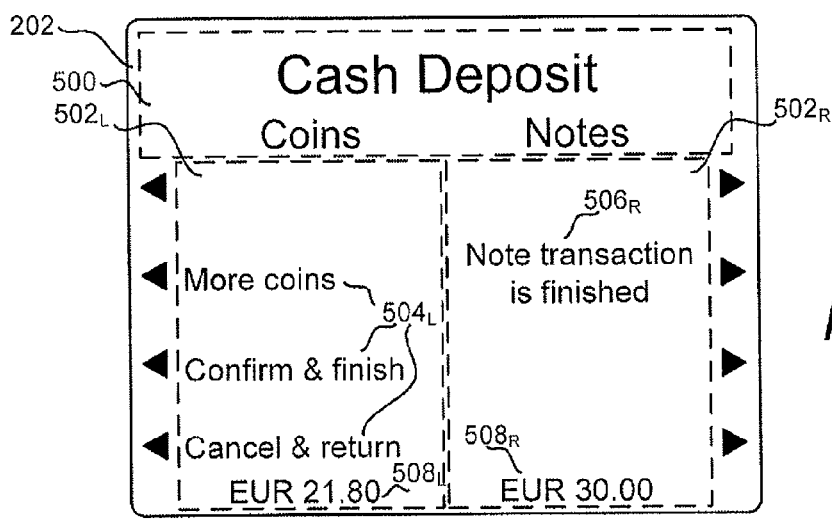

It is now assumed that the user chooses the "Confirm & finish" option for the note deposit transaction, which will cause performance of step 822 of the control thread 760 and a display screen like in FIG. 7h. The control thread 760 will end in step 830 and expire at 748 in FIG. 9. Simultaneously, the second round of the coin deposit transaction has now again reached a stage where all received coins have been processed (see first area $502_L$ of FIG. 7h). This time the user decides to "Confirm & finish", wherein the control thread 750 will end at step 708 via step 707 in FIG. 10 and expire at 746 in FIG. 9.

Figure 7I:
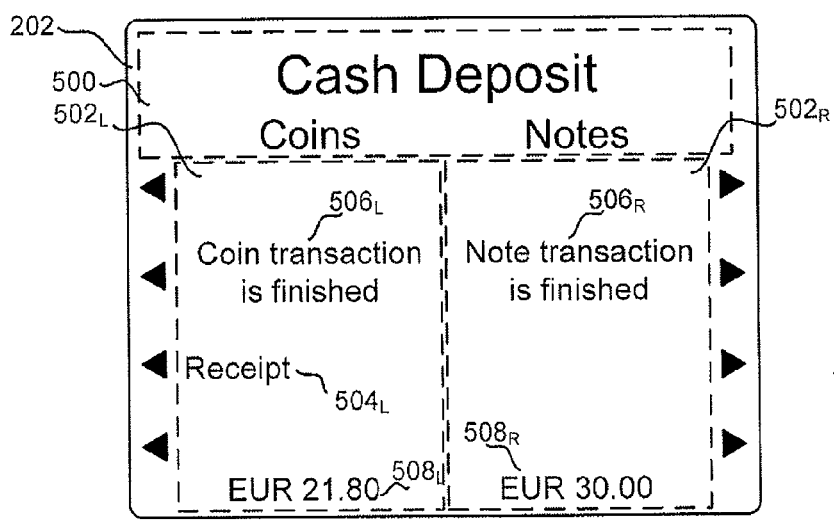
Figure 7J:
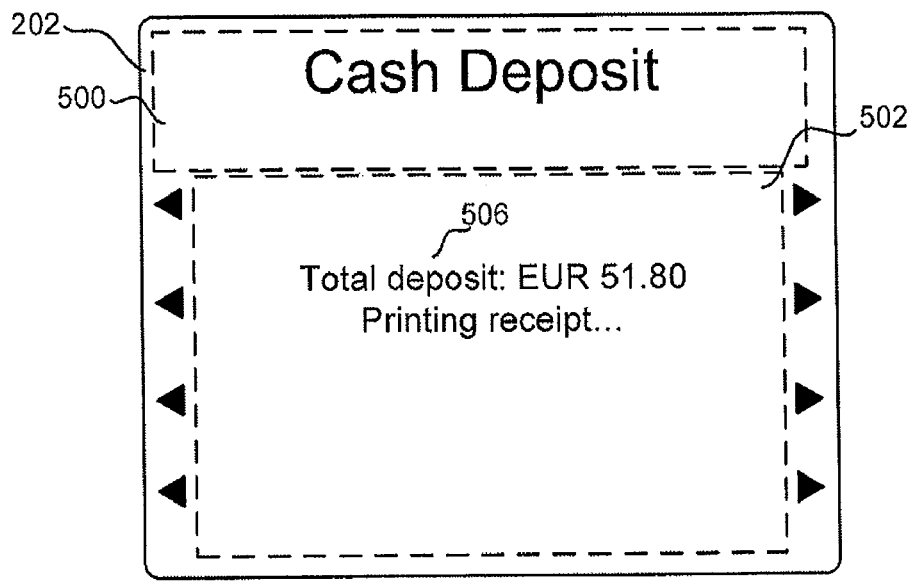
Figure 7K:
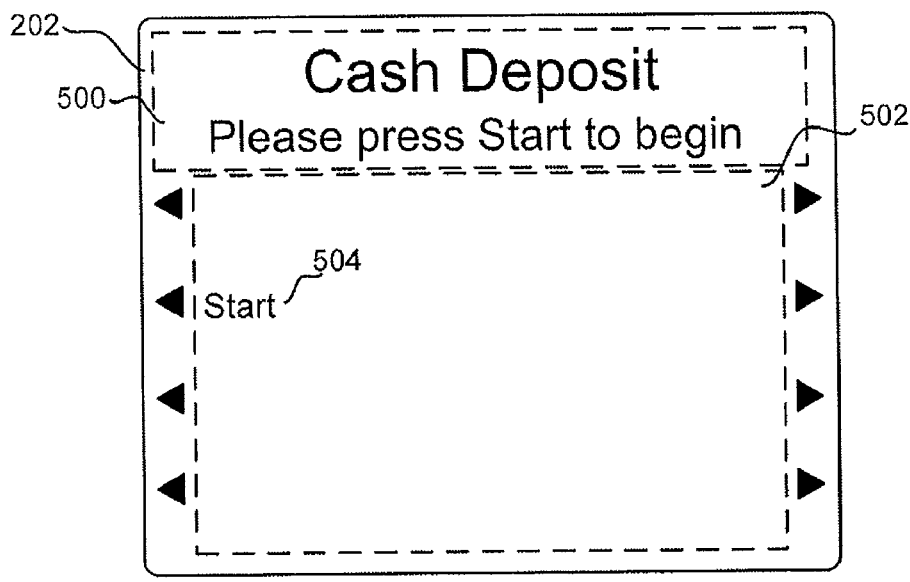

The parallel steps 630a and 630b of FIG. 8 thus end, and a transaction value registering step 640 is reached. Therefore, as seen in FIG. 7i, now that both deposit transactions have been completed, the respective totals are presented at $508_L$ and $508_R$, and the user is given the control option "Receipt" at $504_L$. Upon selection thereof, the transaction value registering device 114 will be actuated by the controller 110, and the user will be informed as shown at 506 in FIG. 7j. When the transaction value registering device 114 has finished its work (i.e., has completed the printing of the receipt in the present example), the operation of FIG. 8 will end at 650, and the idle screen of FIG. 7k will again be shown, as it was at the beginning in FIG. 7a and at step 610.

FIGS. 12a-g illustrate display screen snapshots of an alternative user interface unit during different stages of a typical use scenario of the cash deposit apparatus according to the disclosed embodiment.

Figure 12A:
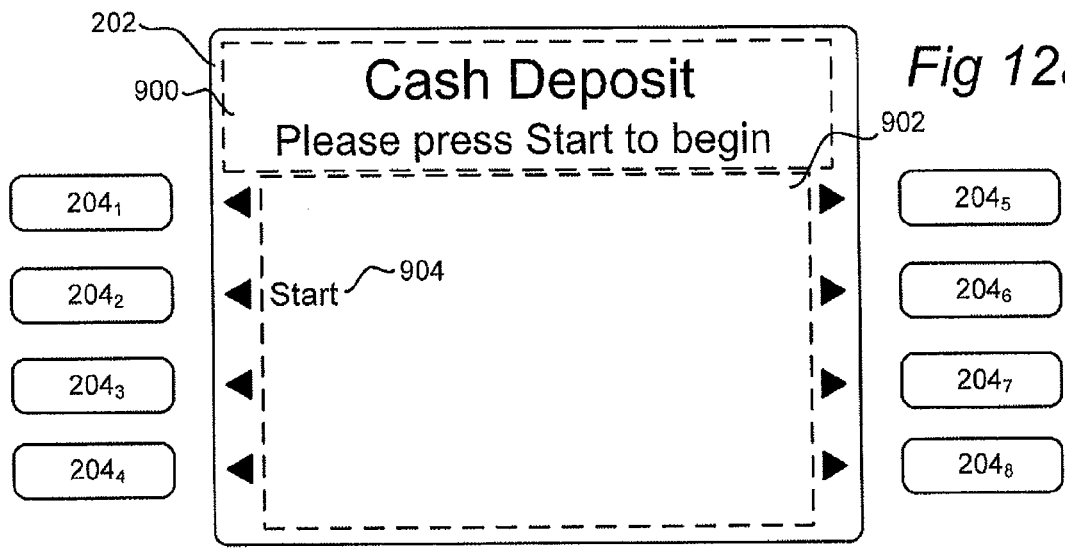
Figure 12B:
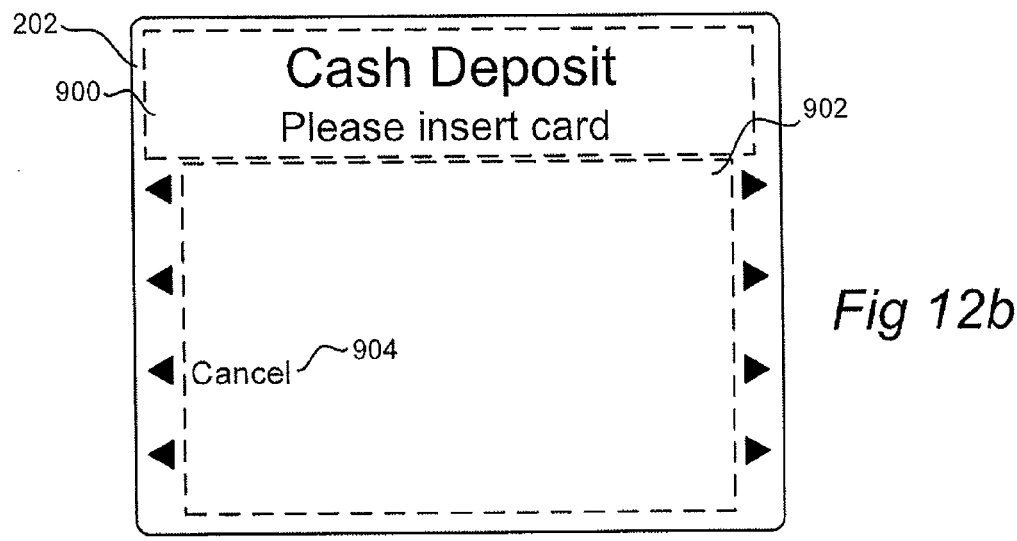
Figure 12C:
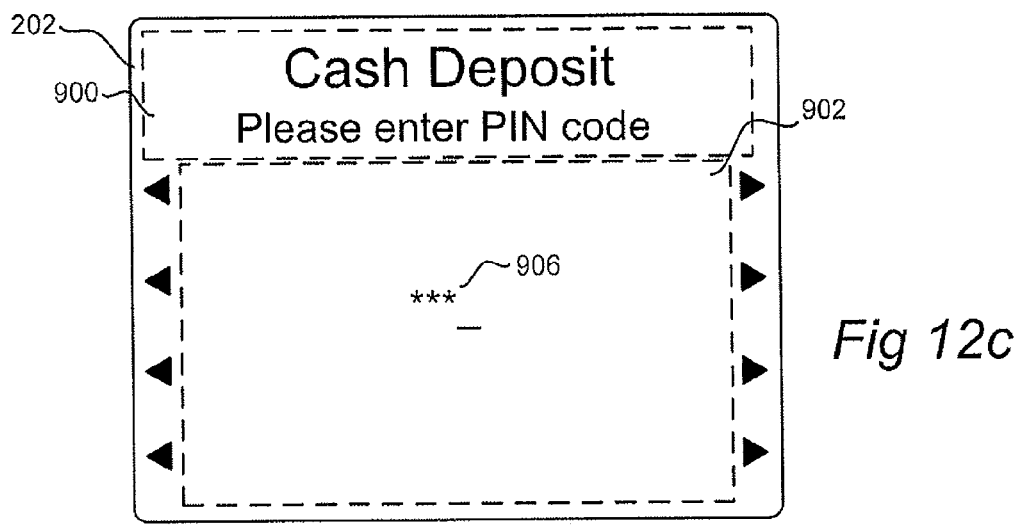

FIGS. 12a-c correspond to FIGS. 7a-c, where reference numeral 900 corresponds to 500, 902 corresponds to 502, 904 corresponds to 504 and 906 corresponds to 506.

Figure 12D:
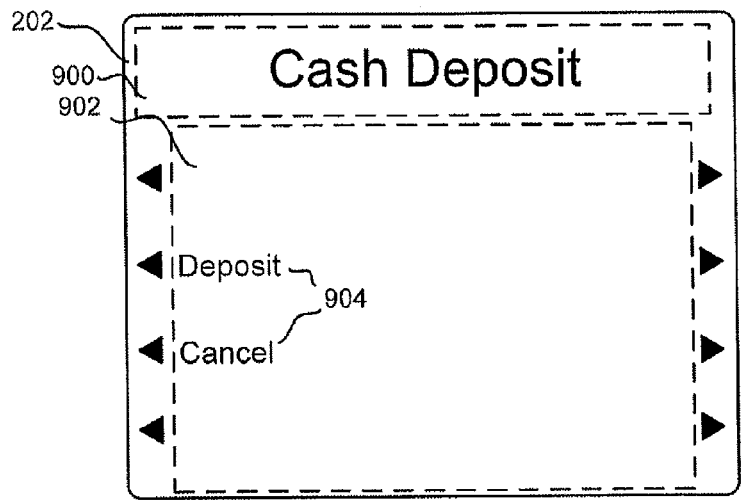

In FIG. 12d, it is shown a single application area 902, and two text labels 904, "Deposit" to deposit cash and "Cancel" to cancel the transaction. Other options can be displayed on this screen if desired. For example, the present invention can be embodied in a cash handling apparatus capable of re-circulating cash, allowing a user to both deposit and dispense cash from the apparatus. In such an embodiment, additional text labels such as "Dispense" and "Change" can be provided.

Figure 12E:
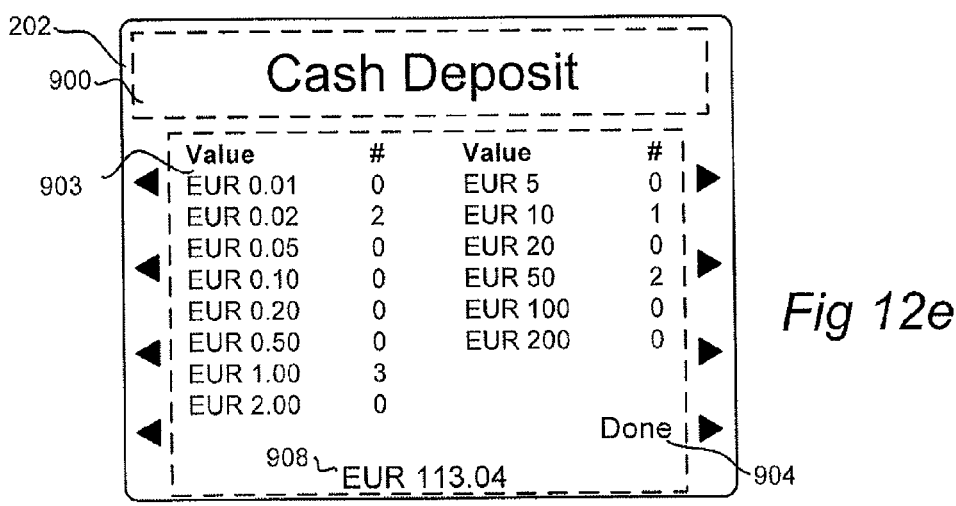

If the user presses the functional key corresponding to "Deposit", the display screen as shown in FIG. 12e is shown, and the user can deposit cash. No further user action is required for the apparatus to accept the cash, other than inserting cash. The user can thus insert either coins, notes, or both, whereby the apparatus can handle coins and notes in parallel. As cash (notes or coins) are accepted, the screen is updated. In this embodiment, a list 903 of acceptable values and number (#) of accepted coins/notes for each of these is shown. A total 908 is kept updated to show a current balance of deposited cash. In other words, in this embodiment, coins and notes can be processed by the apparatus in parallel, even if the screen is not explicitly divided in two parts. When the user has finished depositing cash, the function key corresponding to the text label 904 "Done" is pressed.

Figure 12F:
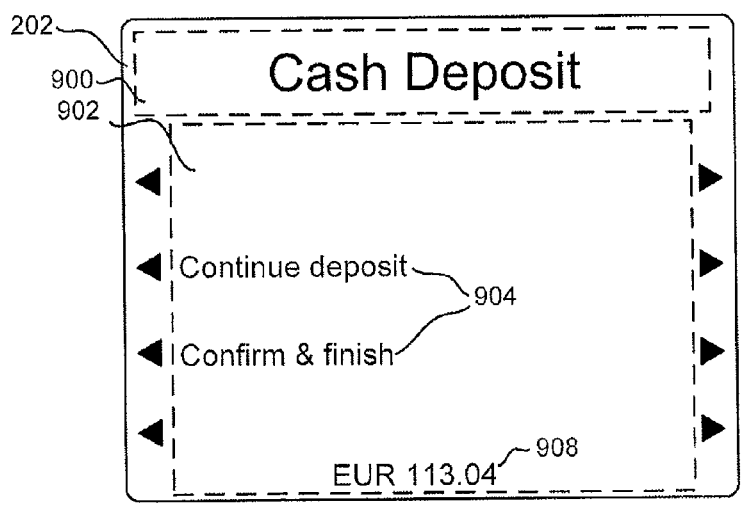

Subsequently, the screen as shown in FIG. 12f is displayed. Here the user has two choices as shown by text labels 904 "Continue deposit" and "Confirm and finish". The total 908 is still shown for reference to the user. If the user presses the function key corresponding to "Continue deposit", the screen as shown in FIG. 12e is shown-again and the user can continue depositing cash. On the other hand, if the user presses the function key corresponding to "Confirm & finish", the screen shown in FIG. 12g is shown.

In FIG. 12g it is shown an informational text 906 that a receipt is being printed.

While the present invention was primarily described by way of reference to an embodiment of a cash deposit apparatus having a coin processing unit and a note processing unit, it is to be noticed that it may equally well be applied to other kinds of cash deposit apparatuses, having first and second cash processing units adapted to handle deposited cash of the same kind or of different kinds, including but not limited to any combination of coin counting, coin sorting, note counting, note validation, note sorting, cheque validation, voucher validation, marker counting, marker sorting, token counting or token sorting. Therefore, other embodiments than what has been disclosed above are of course possible within the scope of the appended claims, as is readily realized by a person skilled in the art.

The foregoing description of the invention illustrates and describes various embodiments of the present invention. As various changes could be made in the above construction without departing from the scope of the invention, it is intended that all matter contained in the above description or shown in the accompanying drawings shall be interpreted as illustrative and not in a limiting sense. Furthermore, the scope of the present invention covers various modifications, combinations, alterations, etc., of the above-described embodiments that are within the scope of the claims. Additionally, the disclosure shows and describes only selected embodiments of the invention, but the invention is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the invention without departing from the scope of the invention.

What is claimed is:

1. A cash deposit apparatus for receiving first cash and second cash from a user, the cash deposit apparatus comprising:

a first cash processing unit for performing a first cash deposit transaction, the first cash processing unit comprising a first cash acceptance module, the first cash deposit transaction comprising receiving first cash in the first cash processing unit, validating the first cash by operation of the first cash acceptance module, and processing the first cash by the first cash processing unit so as to determine a value of the first cash;

a second cash processing unit for performing a second cash deposit transaction, the second cash processing unit comprising a second cash acceptance module, the second cash deposit transaction comprising receiving second cash in the second cash processing unit, validating the second cash by operation of the second cash acceptance module, and processing the second cash by the second cash processing unit so as to determine a value of the second cash;

a user interface unit; and a controller operatively coupled to the first and second cash processing units and to the user interface unit, the controller being adapted to detect a first user action from the user at the user interface unit, control the first cash processing unit to initiate and start performing the first cash deposit transaction in response to detecting the first user action, simultaneously during performance of the first cash deposit transaction, detect a second user action from the user at the user interface unit, and during performance of the first cash deposit transaction and in response to detecting the second user action, control the second cash processing unit to initiate and start performing the second cash deposit transaction.

2. A cash deposit apparatus as defined in claim 1, wherein:
said first user action comprises a first user input, detectable by said user interface unit, and
said second user action comprises a second user input, detectable by said user interface unit.

3. A cash deposit apparatus as defined in claim 1, wherein:
said first user action comprises a deposit of said first cash, and
said second user action comprises a deposit of said second cash.

4. A cash deposit apparatus as defined in claim 1, wherein the first cash processing unit is adapted for processing of deposited cash of a first type, and the second cash processing unit is adapted for processing of deposited cash of a second type, the second type being different from the first type.

5. A cash deposit apparatus as defined in claim 1, wherein the first and second cash processing units are selected from the group consisting of a coin processing unit and a note processing unit.

6. A cash deposit apparatus as defined in claim 1, wherein the controller is further adapted to:
during performance of the first cash deposit transaction, provide, by the user interface unit, an indication of an aggregated value of a part of the first cash which has currently been processed by the first cash processing unit; and
simultaneously, during performance of the second cash deposit transaction, provide, by the user interface unit, an indication of an aggregated value of a part of the second cash which has currently been processed by the second cash processing unit.

7. A cash deposit apparatus as defined in claim 6, the user interface unit comprising a display having a display area, a first part of the display area being allocated to the indication of the aggregated value of the first cash of the first cash deposit transaction and a second part of the display area being allocated to the indication of the aggregate value of the second cash of the second cash deposit transaction, the user interface providing simultaneous indication of the aggregated value of the first cash and the aggregated value of the second cash during simultaneous performance of the first cash deposit transaction and the second cash deposit transaction.

8. A cash deposit apparatus as defined in claim 7, wherein information related to the first cash deposit transaction is presentable in said first part of the display area and information related to the second cash deposit transaction is presentable in said second part of the display area.

9. A cash deposit apparatus as defined in claim 8, the user interface unit further including selective input devices, wherein one or more control options to control said first cash deposit transaction are presentable in said first part of the display area for selection by said selective input devices, and wherein one or more control options to control said second cash deposit transaction are presentable in said second part of the display area for selection by said selective input devices.

10. A cash deposit apparatus as defined in claim 9, wherein presentation, selection and performance of control options for the first cash deposit transaction are handled by the controller independently of the second cash deposit transaction without affecting the second cash processing unit's performance thereof, and vice versa.

11. A cash deposit apparatus as defined in claim 9, wherein, when one of said first and second cash deposit transactions has reached a stage where all hitherto received cash has been processed by its cash processing unit, control options are presented for said one transaction which include a first option for depositing more cash, a second option for confirming the value determined for the received cash, and a third option for canceling the transaction.

12. A cash deposit apparatus as defined in claim 11, wherein, upon selection of said first option, the controller is adapted to control the cash processing unit for said one transaction to receive additional cash and process it so as to determine a joint value of the hitherto received cash and the additional cash.

13. A cash deposit apparatus as defined in claim 11, wherein, upon selection of said second option, the controller is adapted to control the cash processing unit for said one transaction to move the hitherto received cash from an intermediate escrow position in the cash deposit apparatus to a cash storage end position which is inaccessible to a user.

14. A cash deposit apparatus as defined in claim 11, wherein, upon selection of said third option, the controller is adapted to control the cash processing unit for said one transaction to move the hitherto received cash from an intermediate escrow position in the cash deposit apparatus to a cash return position which is accessible to a user.

15. A cash deposit apparatus as defined in claim 1, further comprising a transaction value registering device, wherein the controller is further adapted, upon completion of said first cash deposit transaction as well as said second cash deposit transaction, to:
determine a grand total result of said first and second cash deposit transactions by aggregating the determined value of the first cash and the determined value of the second cash, and
control the transaction value registering device to register the grand total result.

16. A cash deposit apparatus as defined in claim 15, wherein the transaction value registering device is selected from the group consisting of a printer of redeemable receipts or vouchers, a recorder for recording the grand total result on a data carrier, and a device for communicating the grand total result to a remote computer resource.

17. A method of controlling a cash deposit apparatus for receiving first cash and second cash from a user; the cash deposit apparatus having a first cash processing unit and a second cash processing unit, the first cash processing unit being for performing a first cash deposit transaction and having a first cash acceptance module, the first cash deposit transaction comprising receiving first cash in the first cash processing unit, validating the first cash by operation of the first cash acceptance module, and processing the first cash by the first cash processing unit so as to determine a value of the first cash, the second cash processing unit being for performing a second cash deposit transaction and having a second cash acceptance module, the second cash deposit transaction comprising receiving second cash in the second cash processing unit, validating the second cash by operation of the second cash acceptance module, and processing the second cash by the second cash processing unit so as to determine a value of the second cash, the method comprising:
detecting a first user action from the user;
operating the first cash processing unit to initiate and start the first cash deposit transaction in response to detecting the first user action;

during performance of the first cash deposit transaction, detecting a second user action from the user; and simultaneously during performance of the first cash deposit transaction and in response to detecting the second user action, operating the second cash processing unit to initiate and start the second cash deposit transaction.

18. A method as defined in claim 17, wherein the cash deposit apparatus comprises a user interface unit, and detecting said first user action comprises detecting, by the user interface unit, a first user input, and detecting said second user action comprises detecting, by the user interface unit, a second user input.

19. A method as defined in claim 18, wherein:

detecting said first user action involves detecting a deposit of said first cash, and detecting said second user action involves detecting a deposit of said second cash.

20. A method as defined in claim 17, wherein the first cash is of a first type and the second cash is of a second type, the second type being different from the first type.

21. A method as defined in claim 20, wherein the first cash is coins and the second cash is notes, or vice versa.

22. A method as defined in claim 18, further comprising:

during performance of the first cash deposit transaction indicating on the user interface unit an aggregated value of a part of the first cash which has currently been processed by the first cash deposit transaction; and simultaneously, during performance of the second cash deposit transaction, indicating on the user interface unit an aggregated value of a part of the second cash which has currently been processed by the second cash deposit transaction.

23. A method as defined in claim 22, wherein the user interface unit comprises a display having a display area with a first part being allocated to the indication of the aggregated value of the first cash of the first cash deposit transaction and allocating a second part of said display area to being allocated to the indication of the aggregated value of the second cash of the second cash deposit transaction, and the simultaneously indicating comprising displaying the aggregated value of the first cash on the first part of the display area and displaying the aggregated value of the second cash on the second part of the display area.

24. A method as defined in claim 23, wherein information related to the first cash deposit transaction is presented in said first part of the display area and information related to the second cash deposit transaction is presented in said second part of the display area.

25. A method as defined in claims 24, wherein one or more control options to control said first cash deposit transaction are presented in said first part of the display area for selection by selective input means included in the user interface unit, and wherein one or more control options to control said second cash deposit transaction are presented in said second part of the display area for selection by said selective input means.

26. A method as defined in claims 25, wherein presentation, selection and performance of control options for the first cash deposit transaction are handled independently of the second cash deposit transaction without affecting the performance thereof, and vice versa.

27. A method as defined in claim 25, wherein, when one of said first and second cash deposit transactions has reached a stage where all hitherto received cash has been processed, control options are presented for said one transaction which include a first option for depositing more cash, a second option for confirming the value determined for the received cash, and a third option for canceling the transaction.

28. A method as defined in claim 27, further comprising, upon selection of said first option, continuing said one transaction by receiving additional cash and processing it so as to determine a joint value of the hitherto received cash and the additional cash.

29. A method as defined in claim 27, further comprising, upon selection of said second option, moving said hitherto received cash from an intermediate escrow position in the cash deposit apparatus to a cash storage end position which is inaccessible to a user.

30. A method as defined in claim 27, further comprising, upon selection of said third option, moving said hitherto received cash from an intermediate escrow position in the cash deposit apparatus to a cash return position which is accessible to a user.

31. A method as defined in claims 17, further comprising, upon completion of said first cash deposit transaction as well as said second cash deposit transaction, to:

determine a grand total result of said first and second cash deposit transactions by aggregating the determined value of the first cash and the determined value of the second cash, and controlling a transaction value registering device of the apparatus to register the grand total result.

* * * * *